(12) United States Patent
Chatfield et al.

(10) Patent No.: US 7,558,654 B2
(45) Date of Patent: Jul. 7, 2009

(54) APPARATUS AND METHOD FOR PROVIDING FLIGHT OPERATIONS INTEGRATED PLANNING AND ANALYSIS TOOLS

(75) Inventors: Thomas J. Chatfield, Lovettsville, VA (US); Robert W. Garneau, Milton, MA (US); David A. Foy, Niceville, FL (US); J. Eugene Farr, Towsend, WA (US)

(73) Assignee: Northrop Grumman Corporation, Los Angeles, CA (US)

( * ) Notice: Subject to any disclaimer, the term of this patent is extended or adjusted under 35 U.S.C. 154(b) by 542 days.

(21) Appl. No.: 11/220,744

(22) Filed: Sep. 8, 2005

(65) Prior Publication Data

US 2007/0055417 A1   Mar. 8, 2007

(51) Int. Cl.
*G01C 23/00* (2006.01)

(52) U.S. Cl. ............................................. 701/13; 701/3

(58) Field of Classification Search ............... 701/1, 701/3, 13; 342/62; 244/158.1, 158.4; 348/117, 348/123
See application file for complete search history.

(56) References Cited

U.S. PATENT DOCUMENTS 6,965,816 B2 * 11/2005 Walker ........................ 701/16

* cited by examiner

*Primary Examiner*—Yonel Beaulieu
(74) *Attorney, Agent, or Firm*—Andrews Kurth LLP

(57) ABSTRACT

An apparatus and method provide flight operations integrated planning and analysis tools (FOIPAT) to perform integrated planning and analysis tasks for autonomous (unmanned) systems operations. The FOIPAT may be used for space launch and satellite early orbit analysis. The FOIPAT improves the efficiency and accuracy of space launch and satellite operations pre- and post-launch tasks performed by, for example, the US Air Force, the National Reconnaissance Office (NRO) and their support contractors. The FOIPAT provides greater functionality than existing software tools, reduces risk of errors, enhances quality control and data reliability, and reduces launch and flight operations planning cycle time. The FOIPAT may provide methodology for unmanned aerial vehicles (UAV) as well as terrestrial and seagoing systems.

45 Claims, 38 Drawing Sheets

| | | |
|---|---|---|
| 402 — | TRAJECTORY PROPAGATION MODULE | 130 |
| | TRAJECTORY PROPAGATION INPUT/OUTPUT MODULE | ~404 |
| 406 — | ARIES MODULE | |
| | GEODETIC NADIR MODULE | ~408 |
| 410 — | GEODETIC ZENITH MODULE | |
| | NADIR MODULE | ~412 |
| 414 — | NEGATIVE ARIES MODULE | |
| | NEGATIVE SUN NORTH MODULE | ~416 |
| 418 — | NEGATIVE SUN ORBIT MODULE | |
| | NEGATIVE VELOCITY MODULE | ~420 |
| 422 — | RIGHT ASCENSION DECLINATION NADIR MODULE | |
| | RIGHT ASCENSION DECLINATION SUN MODULE | ~424 |
| 426 — | SUN NADIR MODULE | |
| | RIGHT ASCENSION DECLINATION MODULE | ~428 |
| 430 — | SUN NORTH ECLIPTIC MODULE | |
| | SUN NORTH MODULE | ~432 |
| 434 — | SUN ORBIT MODULE | |
| | SUN SOUTH ECLIPTIC MODULE | ~436 |
| 438 — | SUN ZENITH MODULE | |
| | VELOCITY MODULE | ~440 |
| 442 — | ZENITH MODULE | |
| | UNIT VECTOR MODULE | ~444 |
| 446 — | TRANSFORMATIONS MODULE | |
| | SUN SUBROUTINES MODULE | ~448 |
| 450 — | TEXT MAPPER MODULE | |
| | CROSS PRODUCT MODULE | ~452 |
| 454 — | DOT PRODUCT MODULE | |
| | DATE SUBROUTINES MODULES | ~456 |
| 458 — | FILL VECTOR MODULE | |
| | MATRIX VECTOR MODULE | ~460 |
| 462 — | NORAD MODULE | |

CONTINUED FROM FIG. 31

1620

- INPUT CONTROL INPUT FILE NAME — 3302
- INPUT OUTPUT SUMMARY FILE NAME — 3304
- INPUT EARTH GEODETIC MODEL FILE NAME — 3306
- ENTER EPHEMERIS OR TRAJECTORY FILE NAME & PATH — 3308
- SELECT INPUT VECTOR UNITS- M, Ft, Km, OR NM — 3310
- SELECT TYPE OF INPUT ORBIT REPRESENTATION — 3312

21 →
- INPUT INCLINATION — 3320
- INPUT ARGUMENT OF PERIGEE — 3322
- INPUT RIGHT ASCENSION — 3324
- INPUT ORBIT ECCENTRICITY — 3326
- INPUT SEMI MAJOR AXIS — 3328

22 →
- INPUT RIGHT ASCENSION — 3330
- INPUT DECLINATION — 3332
- INPUT RADIUS — 3334
- INPUT SPEED — 3336
- INPUT AZIMUTH — 3338

- INPUT X, Y & Z POSITION VECTOR — 3340
- INPUT X, Y & Z VELOCITY VECTOR — 3342

CARTESIAN REPRESENTATION

- SELECT TYPE OF INPUT BEING USED — 3346
  - LATITUDE → INPUT ARGUMENT OF LATITUDE — 3348
  - ANOMALY → INPUT TRUE ANOMALY — 3350

KEPLERIAN REPRESENTATION

- SELECT TYPE OF INPUT BEING USED — 3352
  - PATH ANGLE → INPUT FLIGHT PATH ANGLE — 3354
  - OFF VERTICAL → INPUT FLIGHT PATH OFF VERTICAL — 3356

ADGARV REPRESENTATION

2 LINE ELSET REPRESENTATION
10 LINE ELSET REPRESENTATION
→ SELECT ELSET FILE — 3358

APPARATUS AND METHOD FOR PROVIDING FLIGHT OPERATIONS INTEGRATED PLANNING AND ANALYSIS TOOLS

TECHNICAL FIELD

The technical field relates to flight operations software tools, and, in particular, to an apparatus and method for providing flight operations integrated planning and analysis tools.

BACKGROUND

Integrated planning and analysis tasks are needed for autonomous, i.e., unmanned, systems operation. Currently, several government agencies and private corporations perform planning and analysis tasks for such autonomous systems. Current space launch and satellite operations tasks include completing link-margin analyses for the launch vehicle and space vehicles to ensure successful receipt of telemetry. Telemetry is required for a broad range of vehicle command, control, navigation, mission specific operational communications, and health monitoring requirements. Effective planning requires the analysis of several factors, including time of day, duration of collection, data rates, and the specific user operations required for command and control of the space vehicle. These tasks require transforming specific orbital state vectors from one earth-centered astronomical reference frame to others; analyzing telemetry links for sources that are moving relative to collectors, e.g., antennas, that may be moving; and development of trajectory information to support collection feasibility for telemetry links being assessed. This comprises the plotting and generation of several collector attributes including antenna gain, phi angle (i.e., vehicle clock or roll angle), theta angle (i.e., line of sight angle), alpha angle (i.e., off bore sight angle of the antenna), azimuth and elevation.

Accomplishing these pre-launch tasks using currently available tools requires significant training for new users. Additionally, generating a comparison of post-flight data to pre-flight predicted data is a manual, time-intensive process. In addition to training, the current tools require engineering expertise and domain knowledge in mission planning, orbit analysis, link-margin analysis, and acquired experience through years of use in order to reliably interpret input data and results.

Current space launch and satellite early orbit analysis processes and tools do not integrate the type of capabilities required for flight operations. The operator must execute multiple steps in transferring data between tools for subsequent operations. The user must generate numerical tables of data, transfer them to separate plotting applications, and plot the information subject to the application's functionality and requirements. Due to the complexity of working with the existing tools and plotting applications, although reliable, errors can be easily introduced in the manual plotting of data or the analysis of collector attributes. Common problems include unit discrepancies, time-tag errors, and data format errors. The current time consuming pre-launch planning and analysis process limits the user's ability to run alternative scenarios necessary where only the trajectory or specification files change.

While the above focuses on space launch and early orbit analysis, many of these limiting factors hold true for unmanned aerial vehicles (UAV) and other autonomous systems operations.

SUMMARY

An apparatus provides a flight operations integrated planning and analysis tool (FOIPAT) to determine and display results of the feasibility of collecting flight vehicle telemetry with predetermined assets. The apparatus includes a collection feasibility analysis (CFA) tool that analyzes telemetry links for sources that move relative to collectors to determine which collectors may be used during vehicle launches. The apparatus also includes a vector transformation (VTX) tool that transforms orbital state vectors from one earth-centered astronomical reference frame to others and a trajectory propagation (TrajProp) tool that generates ephemeris and trajectory input files for the CFA tool. The apparatus further includes an interface that integrates the CFA tool, the VTX tool, and the TrajProp tool, the interface including a main interface screen. The apparatus accepts a user selection and a user input on the main interface screen, loads data based on the user selection and the user input, executes individual programs to generate an output based on the user selection and the user input, and plots and displays the output.

An embodiment of a corresponding method includes the steps of executing a CFA tool, executing a VTX tool, executing a TrajProp tool, and providing an interface that integrates the CFA tool, the VTX tool, and the TrajProp tool. The interface includes a main interface screen. The method accepts a user selection and a user input on the main interface screen, loads data based on the user selection and the user input, executes individual programs to generate an output based on the user selection and the user input, and plots and displays the output. The interface allows the user to generate a number of different types of plots, change plot scale, units or appearance, generate reports, build input files, edit files, and produce printable output files.

Another embodiment of the corresponding method includes the steps of initializing a main interface screen in an interface, accepting a user selection related to flight vehicle telemetry data and a user input on the main interface screen, loading data based on the user selection and the user input, and executing one or more individual programs selected from a group consisting of a CFA tool, a VTX tool, and a TrajProp tool, to generate an output based on the user selection and the user input. The interface integrates the CFA tool, the VTX tool, and the TrajProp tool. The method further includes plotting and displaying the output.

A corresponding computer readable medium includes instructions for initializing a main interface screen, accepting a user selection related to flight vehicle telemetry data and a user input on the main interface screen, loading data based on the user selection and the user input, and executing individual programs to generate an output based on the user selection and the user input. These programs are selected from a group consisting of a CFA tool, a VTX tool, and a TrajProp tool. The interface integrates the CFA tool, the VTX tool, and the TrajProp tool. The computer readable medium further includes instructions for plotting and displaying the output.

DESCRIPTION OF THE DRAWINGS

The exemplary embodiments of the apparatus and method for providing flight operations integrated planning and analysis tools will be described in detail with reference to the following figures, in which like numerals refer to like elements, and wherein:

FIG. 4 illustrates an exemplary trajectory propagation (TrajProp) tool;

FIGS. 31-37 illustrate execution flow charts for the exemplary FOIPAT of FIGS. 5-30;

DETAILED DESCRIPTION

An apparatus and method provide flight operations integrated planning and analysis tools (FOIPAT) to perform integrated planning and analysis tasks for autonomous (unmanned) systems operations. The FOIPAT is used for space launch and satellite early orbit analysis. The FOIPAT improves the efficiency and accuracy of space launch and satellite operations pre- and post-launch tasks performed by, for example, the US Air Force, the National Reconnaissance Office (NRO) and their support contractors. The FOIPAT provides greater functionality than existing software tools, reduces risk of errors, enhances quality control and data reliability, and reduces launch and flight operations planning cycle time. The FOIPAT may provide methodology for unmanned aerial vehicles (UAV) as well as terrestrial and seagoing systems.

The FOIPAT improves the efficiency and accuracy of space launch and satellite operations through the following capabilities: 1) generating graphical launch and early orbit analysis and project planning data by integrating existing collection feasibility analysis (CFA) tools with vector transformation (VTX) tools, trajectory propagation (TrajProp) tools, and other similar tools; 2) eliminating labor intensive manual plotting of data through the use of proprietary software specifically designed to integrate the existing tools; and 3) providing an automated error checking capability to improve reliability of output data.

The structure of the FOIPAT and the graphical display interface enables a diverse set of users, including those that may lack extensive engineering capabilities, to rapidly learn and effectively apply the FOIPAT in executing space launch and satellite operations pre-launch and post-launch tasks. The CFA tool, the VTX tool, and the TrajProp tool are software programs that may be used in a stand-alone manner to execute specific subtasks required for flight operations planning and analysis. The FOIPAT graphically integrates the CFA, VTX, and TrajProp software tools and enables integrated planning and analysis for autonomous system operations.

Figure 1:
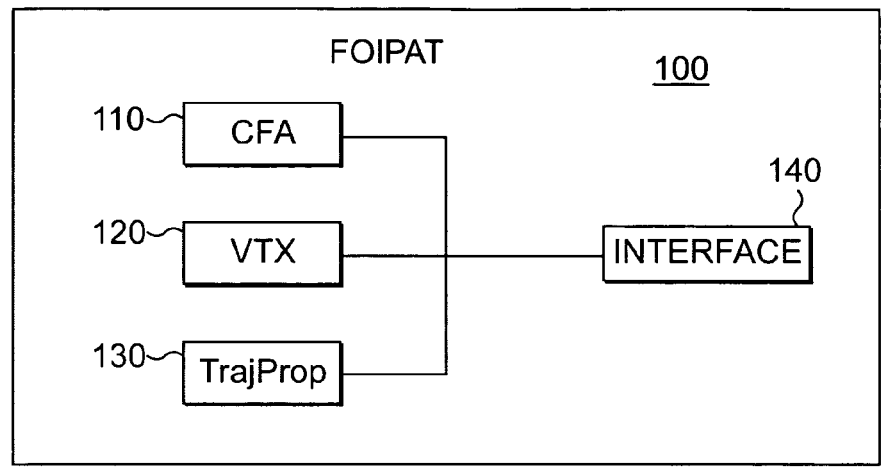
FIG. 1 illustrates an exemplary system for providing flight operations integrated planning and analysis tools.

FIG. 1 illustrates an exemplary system for providing flight operations integrated planning and analysis tools. A FOIPAT 100, i.e., FOIPAT software tool or FOIPAT software program, uses a FOIPAT interface 140 to integrate a CFA tool 110, a VTX tool 120, and a TrajProp tool 130.

The CFA tool 110 provides analysis of telemetry (TLM) links for sources that are moving relative to collectors that may be moving. The CFA tool 110 calculates TLM link-margin at two different Bit Error Rates (BER), Signal to Noise (S/N) at the receiver, and Received Signal Strength (RSS) as a function of the position and attitude of the TLM source relative to the collector position. To accomplish these analyses, the user provides the performance characteristics of the collectors to be used along with associated ephemeris or ground location data. The characteristics of the TLM source and antenna gain patterns along with its trajectory and attitude data may also be needed.

The CFA tool 110 includes collectors located on the ground, in the air, or in space. Space-borne collectors may be used subject to a ground station visibility constraint. The user may select from multiple different TLM antenna gain pattern representations and may enter, for example, up to 99 different analyses phases, each with totally different TLM and antenna characteristics. The CFA tool 110 does not consider atmospheric attenuation or refraction. All attitude calculations and position transformations are accurate to 0.1 degree, for example. These accuracies are appropriate given the typical one-degree accuracy of input TLM antenna gain information available.

The CFA output provides, as a function of trajectory time for each collector during its visibility span, the collector and target positions, range, gain margin, azimuth, elevation, S/N and RSS as well as TLM antenna to collector pointing angles. The output file also contains all the input control as well as the basic TLM link and collector data input. Collectors may include remote tracking stations (RTS), tracking and data relay satellite systems (TDRSS), and mobile ground stations.

Collector selection is based on gain margin, i.e., collection feasibility, during critical time spans. The TLM source to collector attitude data is used to determine if the results are reasonable, i.e., as expected, to understand poor link performance, or to determine if the vehicle flight attitude or antenna selection should be modified to improve TLM link performance. The attitude data presented by the CFA tool 110 describes the line of sight from the TLM source (i.e., target) to the collector relative to the target vehicle coordinates. The attitude data is in angles relative to the target vehicle XBODY, YBODY and ZBODY axis (i.e., roll, pitch and yaw axis). RSS and S/N data output by the CFA tool 110 can be used for post flight analysis as the collectors typically report link performance in terms of those parameters.

Figure 2:
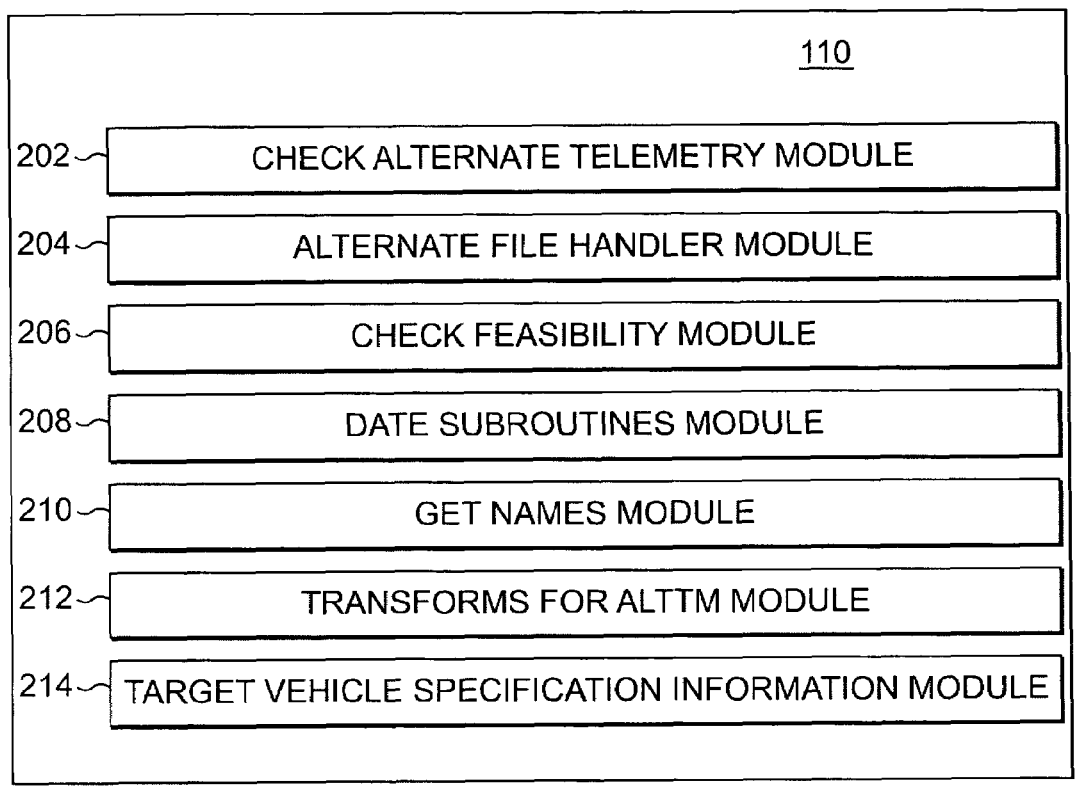
FIG. 2 illustrates an exemplary collection feasibility analysis (CFA) tool.

FIG. 2 illustrates an exemplary CFA tool 110 that includes a number of main modules, e.g., files, programs, or subroutines. A check alternate telemetry module ("ALTTM") 202, e.g., CheckAltTM Module, may determine if other collectors could be used to collect telemetry during a space launch or on orbit. An alternate file handler module 204, e.g., AltFileHandler Module, supports alternate telemetry by accessing the various files for alternate telemetry analysis. A check feasibility module 206, e.g., CheckFeas Module, determines the feasibility for a specific time, analysis type, antenna position, antenna type, and target vehicle and collector location. A date subroutines module 208, e.g., DateSubs Module, supports ALTTM by performing the date functions. A get names module 210, e.g., GetNames Module, supports ALTTM by reading the names of the files, from the control input file whose name is specified by the analyst. A transforms for ALTTM module 212, e.g., XForms4alttm Module, supports ALTTM by transforming the "True of Date" to earth fixed Greenwich ("EFG") coordinates. The transforms for ALTTM module 212 also converts "Greenwich hour angle" rotation after launch into EFG. A target vehicle specification information module 214, e.g., GetLVSpecs Module, reads and reports the target vehicle specification file.

Exemplary modules and subroutines of the CFA tool 110 are provided in Appendix 1. These modules are described for illustration purposes only. One skilled in the art will appreciate that other modules, routines, subroutines, and functions can be included in the exemplary CFA tool 110.

In an exemplary embodiment, six types of input files are used by the CFA tool 110. A main input file identifies other input files, names the output report and the output summary files, and names the collectors being analyzed. The main input file also provides the collectors' gravitational constant/tesla and G/T's (G/T is Antenna Gain divided by background noise temperature in degrees Kelvin expressed in dB), and the type of collector, such as GROUND, SPACE, AIR, or space-ground (SPCGND). SPCGND is a space collector with collection constrained by the location of its ground station for signal reception. The input file also defines the launch time, e.g., GMT for the t=0 of the trajectory file, and the report title for the first record of the output report files.

Moving collector files, such as SPACE, SPCGND, or AIR files, are fixed length record files that containing collector positions at specific times. One file may exist for each collector. The time interval between each collector position record may be constant throughout the file. The first record provides information about the contents of the file, including the time of the first position, for example. The first record also provides the time interval between collector positions, number of collector positions in the file, the coordinate system for the collector positions, and units of the coordinate system. This first record further provides minimum allowable elevation angles for air collectors as well as maximum off nadir pointing limits for overhead space collectors. Ground collectors may not be in this file because the file may be restricted to collectors that are "in motion." Ground collector location and collection constraints are contained in the files that include information about a multiple number of ground based collectors.

A target vehicle trajectory file contains the target vehicle positions, attitude direction cosines, and in some instances, the antenna identification (ID) in use. Each record contains the time in seconds after launch and all of the above information. The times do not have any constraint. The CFA tool 110 processes each record individually. The times do not need to increase.

A target vehicle specification file contains detailed information about the various analysis phases to be performed on the vehicle and TLM systems. The analysis phases are associated with launch stages. Alternatively, the analysis can be performed for any vehicle "phase." The target vehicle specification may be complicated input file because the target vehicle specification has "conditional" formats that are dependent on the analysis type.

Ground location files may provide multiple records. Each record contains the name of a ground located collector, its unit of measure, the elevation angle constraint, and the collector location in earth fixed coordinates. Also, the ground location files may contain the location of any ground stations that constrain the collection of space collectors, i.e., SPCGND type collections.

A summary report generated by the CFA tool 110 lists all the information in the "Input" and "Vehicle Spec" files. In addition, the summary report summarizes the collectability conclusion information in the time spans where the different collectability levels apply. A full report generated by the CFA tool 110 list all the information in the "Input" and "Vehicle Spec" files. The heading for the analysis results reporting may be self explanatory.

The VTX tool 120 is a software application that transforms orbital state position and velocity vectors from one earth-centered astronomical reference frame to others. Since the relationships between these frames are time varying, the state vector epic time is included. For the Atlantic missile range (AMR), the go inertial time is also included. Vectors may be entered in Cartesian or ADBARV Spherical coordinates. ADBARV components include. Right Ascension, Declination, Flight Path Off Vertical, Azimuth, Radius Magnitude, and Velocity Magnitude. The VTX tool 120 operates with the following six different reference frames:

J2000 (Mean of Julian Date 2000.0);

MEME (Mean Equator and Mean Equinox of Date);

TEME (True Equator and Mean Equinox of Date—e.g., North American Aerospace Defense Command (NORAD));

TOD (True Equator and Equinox of Date);

EFG (Earth Fixed, Greenwich Meridian—e.g., Earth fixed rotating); and

AMR (Atlantic Missile Range—e.g., Titan ECI).

(X axis is fixed in inertial space at Go Inertial Time).

All transformations are accurate to 0.6 arc second for any vector epic between Julian dates 1900.0 and 2100.0. Dates outside that range are not accommodated. AMR and EFG vectors are also subject to the accuracy of the Delta UTC (Earth Rotation) parameter entered. For any representation and reference frame input, all reference frames and representations are output along with other orbit data of interest. The VTX tool 120 may be used to check contractor provided vector representations as well as to transform vectors into representations and frames used by other applications. ADBARV (Spherical) and Keplarian representations are used in Search Procedure Design work. Also, since TrajProp uses vectors in reference frames with True Equators, sometimes transformations are needed.

Figure 3:
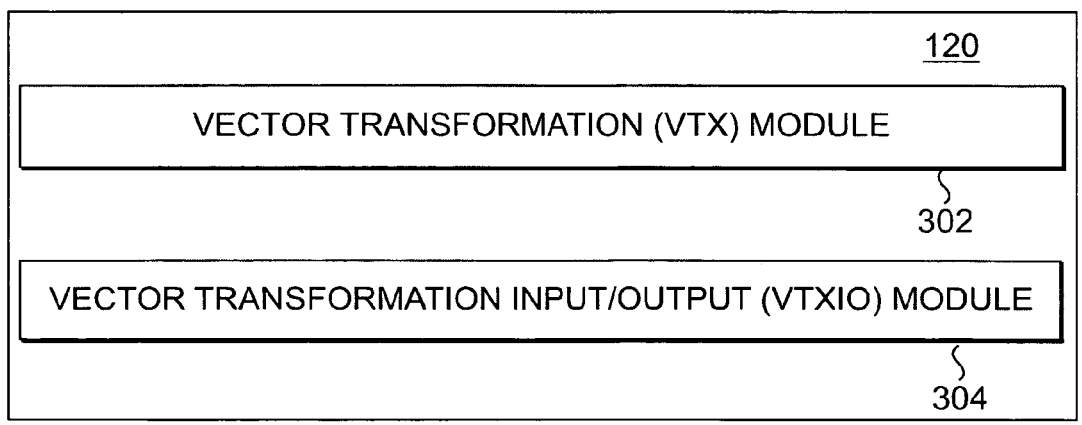
FIG. 3 illustrates an exemplary vector transformation (VTX) tool.

FIG. 3 illustrates an exemplary VTX tool 120 that includes a number of main modules. An embodiment of a vector transformation module 302 accepts Cartesian or ADBARV component vectors in any of the following reference frames and transforms the vector into all of the other reference frames: 1) Mean of Julian Data 2000.0 (J2000); 2) Mean Equator and Mean Equinox of Date (MEME); 3) True Equator and Mean Equinox of Date (TEME); 4) True Equator and Equinox of Date (TOD); 5) Earth Fixed, Greenwich Meridian (EFG); and 6) Atlantic Missile Range (AMR). The vector transformation module 302 also generates Keplerian and oblate earth orbit characteristics. A vector transformation input/output (VTXIO) module 304 manages input/output (I/O) interaction with the file system. The vector transformation I/O module 304 contains a number of subroutines that interact with various portions of file I/O.

Exemplary modules and subroutines of the VTX tool 120 are provided in Appendix 2. These modules, routines, subroutines, and functions are listed for illustration purposes only. One skilled in the art will appreciate that other modules, routines, subroutines, and functions can be equally included in the exemplary VTX tool.

Three input text files are used by the VTX tool 120. An input control text file contains details of the vector to be transformed, the output file title and case description as well as the names of the EIRS, Geodetic parameters and output files. When executing the application the user is prompted to enter the name of this control file. A EIRS text file contains the earth orientation parameters, i.e., parameters that adjust the definition of the earth's orientation due to variations in the earth's rotation rate. A geodetic parameter text file contains the earth's geodetic model parameters, e.g., WGS 84 parameters may be in one file, WGS 72 parameters may be in another.

The TrajProp tool 130 may be a stand-alone trajectory propagation tool or a generator for the ephemeris or trajectory input files for the CFA tool 110. The TrajProp tool 130 may be used when collector ephemeredes are not readily available in the format needed or if trajectory or attitude data is not provided for the TLM source vehicle. A user may input either a Cartesian, ADBARV, ADGARV, Keplarian, or NORAD ElSet representation of the orbit state vector. ADGARV uses Flight Path Angle and ADBARV uses Flight Path Off Vertical. The TrajProp tool 130 uses a simple Keplarian propagator considering only J2 or the full NORAD propagator for NORAD ElSet inputs. If the output is to be a trajectory or attitude file for the CFA tool 110, the user may choose from several different attitude orientation options each with complete vehicle axis alignment freedom. The output is a summary of the input information plus the trajectory or ephemeris file requested in a format required by CFA.

FIG. 4 illustrates an exemplary TrajProp tool 130 that includes a number of modules. A trajectory propagation module 402, e.g., TrajProp Module, is the main program that converts a vector or element set from one format to other formats. The Trajectory propagation module may also propagate the orbit at regular intervals and output in either of two formats compatible with the CFA application, e.g., trajectory file or collector ephemeris file. A trajectory propagation I/O module 404, e.g., TrajPropIO Module, manages input and output interaction with the file system. The trajectory propagation I/O module 404 contains a number of subroutines which interact with various portions of file I/O.

An Aries module 406 creates the Aries based attitude for trajectory propagation. A geodetic nadir module 408, e.g., GeodeticNadir Module, creates the geodetic nadir based attitude for trajectory propagation. A geodetic zenith module 410, e.g., GeodeticZenith Module, creates the geodetic zenith based attitude for trajectory propagation. A nadir module 412 creates the nadir based attitude for trajectory propagation.

A negative Aries module 414, e.g., NegAries Module, creates the negative Aries based attitude for trajectory propagation. A negative sun north module 416, e.g., NegSunNorth Module, creates the negative sun north based attitude for trajectory propagation. A negative sun orbit module 418, e.g., NegSunOrb Module, creates the negative sun orbit based attitude for trajectory propagation. A negative velocity module 420, e.g., NegVel Module, creates the negative velocity based attitude for trajectory propagation.

A right ascension declination nadir module 422, e.g., RDNadir Module, creates the right ascension declination nadir based attitude for trajectory propagation. A right ascension declination sun module 424, e.g., RDSun Module, creates the right ascension declination sun based attitude for trajectory propagation. A sun nadir module 426, e.g., SunNadir Module, creates the sun nadir based attitude for trajectory propagation.

A right ascension declination module 428, e.g., RtAscDecl Module, creates the right ascension declination based attitude for trajectory propagation. A sun north ecliptic module 430, e.g., SunNecl Module, creates the sun north ecliptic based attitude for trajectory propagation. A sun north module 432, e.g., SunNorth Module, creates the sun north based attitude for trajectory propagation. A sun orbit module 434, e.g., SunOrb Module, creates the sun orbit based attitude for trajectory propagation. A sun south ecliptic module 436, e.g., SunSecl Module, creates the sun south ecliptic based attitude for trajectory propagation. A sun zenith module 438, e.g., SunZenith Module, creates the sun zenith based attitude for trajectory propagation.

A velocity module 440 creates the velocity based attitude for trajectory propagation. A zenith module 442 creates the zenith based attitude for trajectory propagation. A unit vector module 444, e.g., UnitVector Module, creates a unit vector from any 3-tuple vector. A transformations module 446, e.g., xforms Module, inputs "True of Date" coordinates and Julian date and computes EFG coordinates. A sun subroutines module 448, e.g., SunSubs Module, contains various sun related subroutines. A text mapper module 450, e.g., TextMapper Module, inputs text for attitude axis values and maps into numerical values.

A cross product module 452, e.g., CrossProduct Module, calculates the cross product of two 3-tupple vectors. A dot product module 454, e.g., DotProduct Module, calculates the dot product of two 3-tupple vectors. A date subroutines module 456, e.g., DateSubs Module, contains various date conversion subroutines. A fill vector module 458, e.g., FillVector Module, makes a copy of a vector. A matrix vector module 460, e.g., MatrixVector Module, multiplies a vector times a matrix generating an output vector. A NORAD module 462 provides the user with a means of propagating NORAD element sets in time to obtain the position and velocity of the space object.

Exemplary modules and subroutines of the TrajProp tool 130 are provided in Appendix 3. These modules are described for illustration purposes only. One skilled in the art will appreciate that other modules, routines, subroutines, and functions can be equally included in the exemplary TrajProp tool 130.

All orbit representations are relative to an earth-centered inertial (ECI) reference frame that uses the earth's true equatorial plane as part of its definition. Both propagators used by the TrajProp tool 130 are designed to match that definition. AMR (i.e., Titan ECI), TOD (i.e., TETE) and TEME are appropriate input frames. Since CFA may use the AMR and TOD output of the TrajProp tool 130, the NORAD TEME ephemeredes may be used in the CFA tool 110 as "TOD" with little loss of accuracy.

Other user inputs, which are specific to the CFA files, include: the reference day/date/time to be associated with the output ephemeris or trajectory file; offset time from the input vector/orbit epoch to this reference time; desired file names; data start/stop times; output frequency; and, attitude alignment specifications. The trajectory propagator obtains all of its information from files, except for the "control" file that identifies the other files involved and the input values.

The TrajProp tool 130 may be treated as two parts. The first part provides the transformation of the input vector/orbit to the other representations. The second part, which may be optional, includes using the input vector/orbit and propagating it into the future in either of two formats. The formats are designed to be consistent with the CFA tool 110: either the trajectory file format or the ephemeris file format. Thus, some of the input parameters are dependent on the specific output format desired.

In addition to the output file, the TrajProp tool 130 may generate an error file TrajPropError.txt that contains any errors generated during execution of TrajProp.

The TrajProp tool 130 relies on an input or "Control" file. Thus, the only user interaction may be the program asking for an input control file name and the user entering the appropriate file name. All subsequent information may be read from the file, which also identifies other files including the 1 or 2 output file names.

Figure 5:
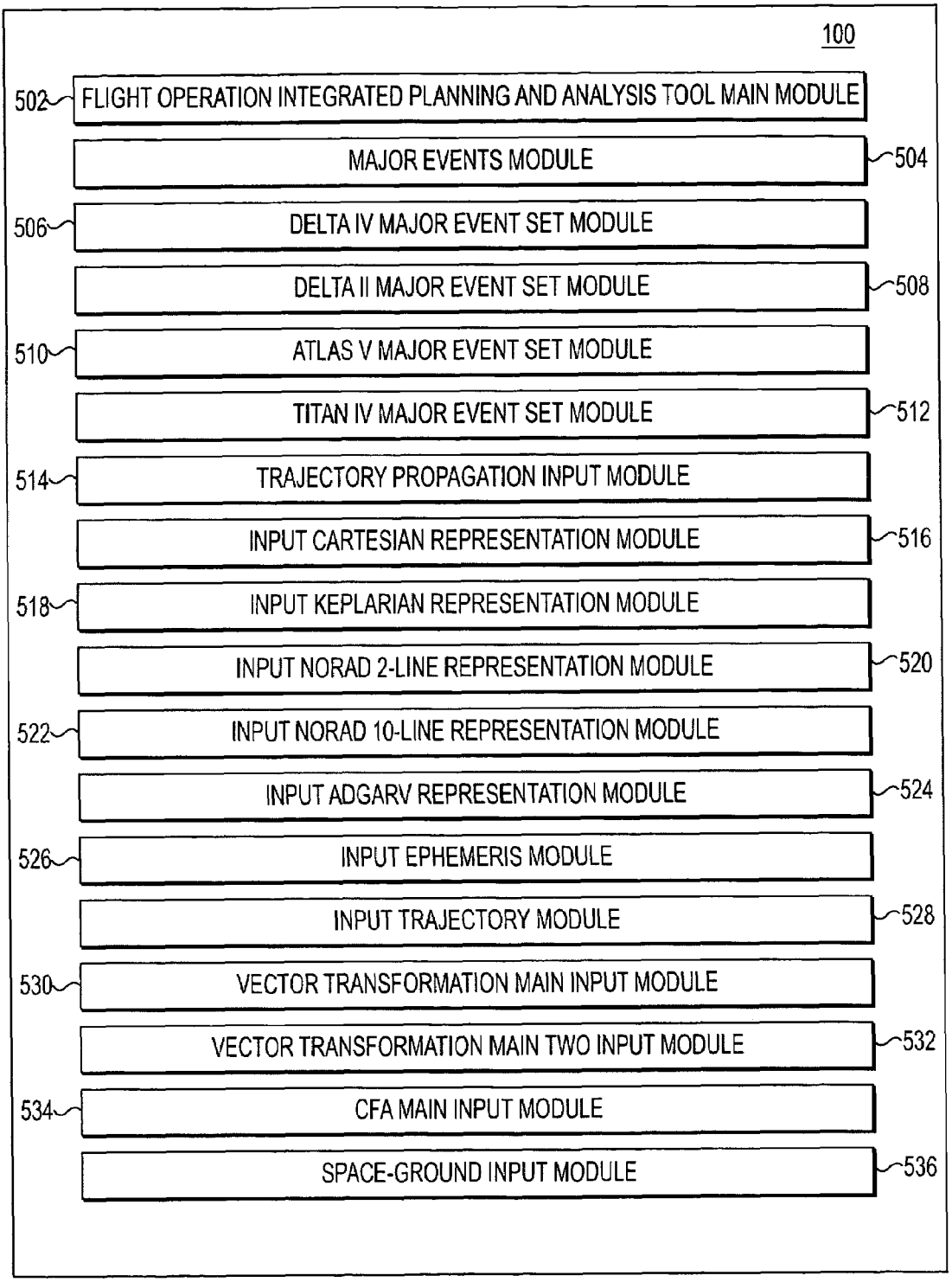
FIG. 5 illustrates an exemplary flight operations integrated planning and analysis tool (FOIPAT)

FIG. 5 illustrates an exemplary FOIPAT tool 100 that includes main modules. A flight operation integrated planning and analysis tool main module 502, e.g., FOIPAT Module, initializes the main interface screen and contains all the control actions and calls to subroutines when buttons are selected on the main interface screen. A major events module 504, e.g., MajorEvents Module, displays the major events screens for events such as Delta IV, Delta II, Atlas V, Titan IV and others. Selecting the vehicle radio button directs the user to the sub-screen for the appropriate vehicle and collects the input information. While these events are relevant to current launch vehicles, additional events based on changes in mission requirements, modification of current launch vehicles, or development of new launch systems may be developed for the major events module 504, for example.

A Delta IV major event set module 506, e.g., DeltaIVMajorEventSet Module, initializes the Delta IV major event screen and passes on the input values to the major events module. A Delta II major event set module 508, e.g., DeltaIIMajorEventSet Module, initializes the Delta II major event screen and passes on the input values to the major events module. An Atlas V major event set module 510, e.g., AtlasVMajorEventSet Module, initializes the Atlas V major event screen and passes on the input values to the major events module. A Titan IV major event set module 512, e.g., TitanIVMajorEventSet Module, initializes the Titan IV major event screen and passes on the input values to the major events module.

A trajectory propagation input module 514, e.g., TrajPropInput Module, initializes the TrajProp input screen that allows the user to select any one of the following coordinate system representations: Cartesian, Keplarian, NORAD 2-line, NORAD 10-line, ADGARV, or ADBARV. The trajectory propagation input module 514 also allows the user to determine if he wants to generate an ephemeris file or a trajectory file with TrajProp. Finally, after gathering all the information from the coordinate system representation subscreens, the trajectory propagation input module 514 constructs the TrajProp control input file.

An input Cartesian representation module 516, e.g., InputCartesianRep Module, initializes the Cartesian representation input screen and accepts position and velocity vector input that is passed on to the trajectory propagation input module for writing to the TrajProp control input file. An input Keplarian representation module 518, e.g., InputKeplarianRep Module, initializes the Keplarian representation input screen and accepts argument of latitude, perigee, true anomoly, right ascension, eccentricity, semi-major axis and inclination input that is passed on to the trajectory propagation input module for writing to the TrajProp control input file.

An input NORAD 2-line representation module 520, e.g., InputNorad2LineRep Module, initializes the NORAD 2-line representation input screen and accepts 2-line ElSets as input that is passed on to the trajectory propagation input module for writing to the TrajProp control input file. An input NORAD 10-line representation module 522, e.g., InputNorad10LineRep Module, initializes the NORAD 10-line representation input screen and accepts 10-line ElSet information that is passed on to the trajectory propagation input module for writing to the TrajProp control input file. An input ADGARV representation module 524, e.g., InputADGARVRep Module, initializes the ADGARV (or ADBARV) representation input screen and accepts declination, radius, flight path, azimuth, and speed as input that is passed on to the trajectory propagation input module for writing to the TrajProp control input file.

An input Ephemeris module 526, e.g., InputEphemeris Module, initializes the ephemeris option input screen and accepts epoch to ephemeris start time, ephemeris start time, ephemeris position, number of positions, coordinate reference frame, limit angle off antenna Boresite, and ephemeris units as input. The input is passed on to the trajectory propagation input module for writing to the TrajProp control input file. An input trajectory module 528, e.g., InputTrajectory Module, initializes the trajectory option input screen and accepts attitude option, trajectory units, time of launch, time after launch to epoch, start time, stop time, data frequency, right ascension, declination, primary body choice, secondary body choice, and angle of rotation as input. The input is passed on to the trajectory propagation input module for writing to the TrajProp control input file.

A vector transformation main input module 530, e.g., VTXMainInput Module, initializes the VTX main input screen that allows the user to select the reference frame, sub heading, control input file name, output file name, geodetic model file name, reference longitude, longitude, EIRS file name and delta time. Finally, after gathering this information and calling a second screen module, e.g., vector transformation main two input module, the vector transformation main input module 530 constructs the VTX control input file.

A vector transformation main two input module 532, e.g., VTXMainTwoInput Module, initializes the VTX main two input screen that allows the user to select the distance units, coordinate system, right ascension, declination epoch, flight path angle, azimuth, magnitude of radial position, position vector, and velocity vector. Finally, after gathering this information the vector transformation main two input module returns to the VTX main input module for creation of the VTX control file.

A CFA main input module 534, e.g., MainInput Module, builds a CFA control input file after collecting G/T, gain, band width, position file, collector type, collector name, location collector name using multiple screens and allowing the user to select collectors using a list box. The collector information read into the list box is obtained from the DefaultCollectors.xls database. The CFA main input module builds a CFA control input file after gathering information. A space-ground input module 536, e.g., SPCGNDInput Module, initializes the space-ground input screen list box, allowing the user to select a ground station and position file with any ground-space collectors selected in the CFA main input module.

Exemplary modules and subroutines of the FOIPAT tool 100 are provided in Appendix 4. These modules are described for illustration purposes only. One skilled in the art will appreciate that other modules, routines, subroutines, and functions can be equally included in the apparatus and method for providing flight operations integrated planning and analysis tools.

Figure 6:
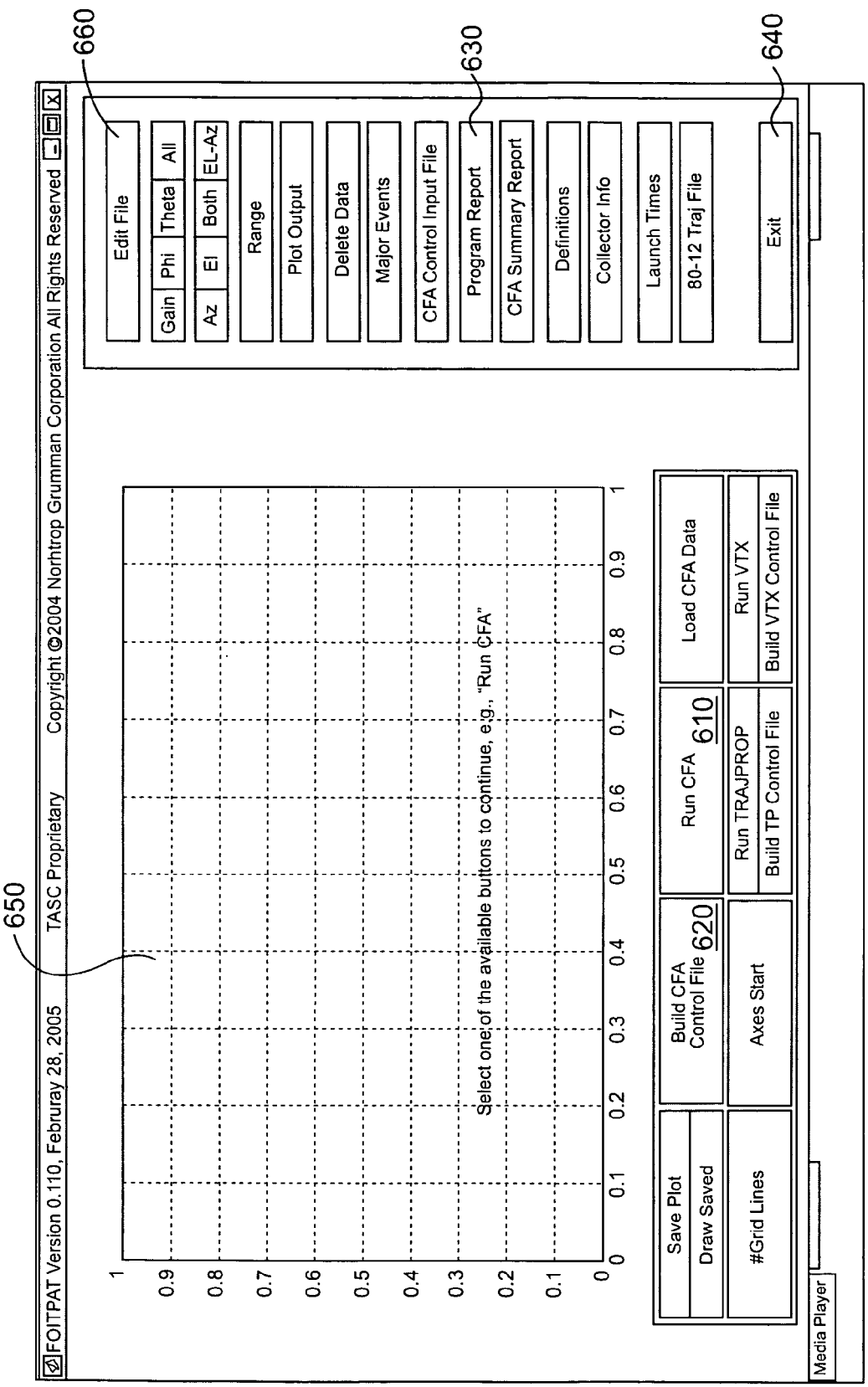
FIGS. 6-30 illustrate an exemplary FOIPAT integrated user interface.

FIGS. 6-30 illustrate an exemplary FOIPAT integrated user interface 140. FIG. 6 shows an initial screen 650 of the exemplary FOIPAT integrated user interface 140, which includes buttons, such as a "Run CFA" button 610, a "Build CFA Control File" button 620, a "Program Report" button 630, an "Edit File" button 660, and an "Exit" button 640. The "Run CFA" button 610 executes the CFA tool 110. The "Program Report" button 630 may be used to check for errors when running one of the application programs, such as the VTX, TrajProp, or CFA tools. The "Program Output" button 630 shows any problems that occur when the CFA tool 110 is executed. The "Program Report" button 630 also shows the report output from the last program (CFA, VTX, or TrajProp)

that is executed. In an embodiment, the "Program Report" button 630 is not accessible until one of these programs is executed.

The "Edit File" button 660 brings up a file selection box 750 (shown in FIG. 7), allowing the user to access the CFA directory and to select a text file for a notepad text editor. The "Edit File" button 660 also allows the user to edit text files to make appropriate changes.

Figure 7:
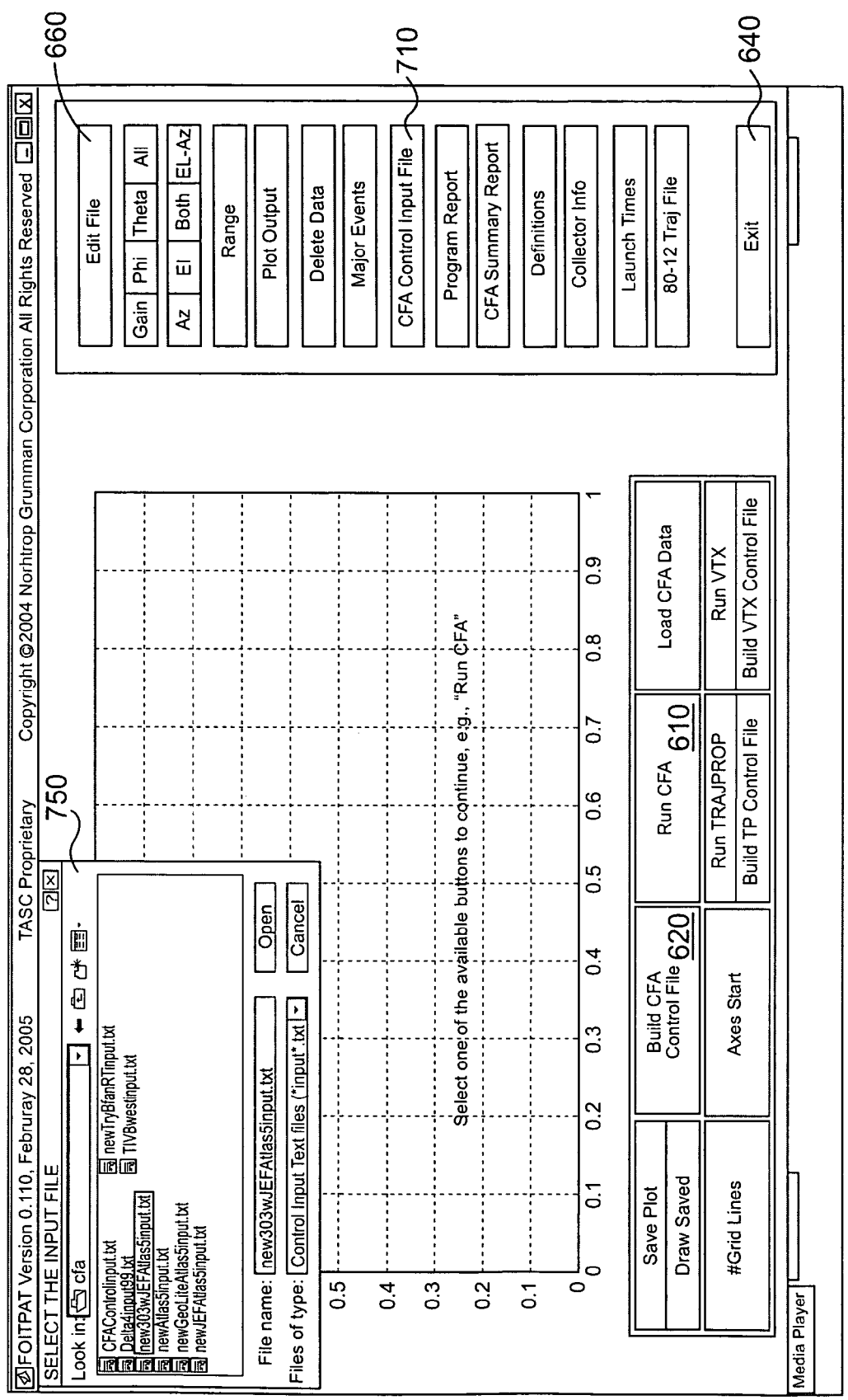

FIG. 7 illustrates the exemplary user interface 140 with a file selection box 750 associated with the CFA tool 110. The "Run CFA" button 610 first requests the name of the control input file so that it can run an executable file, such as cfa308W_Mat.exe, with the appropriate input. Note that the file selection box 750 may show files containing the string "input." CFA control input files may have lower case "input" in their name. Other files may be accessed by using the "Files of type" pull down menu and selecting *.* files. All CFA control files (or associated files) may be placed in the CFA directory.

In FIG. 7, a "new303wJEFAtlas5input.txt" CFA control input file is selected. Many of the buttons may not be available yet because no data has been read in. When a user selects "Open" or double clicks on the control file, the FOIPAT 100 executes the CFA tool 110 and generates the appropriate report file and a data file for each collector. When the CFA tool 110 is executed, all existing data collector files are deleted automatically before the new ones are created. With continued reference to FIG. 7, the "CFA Control Input File" button 710 allows the user to select any of the existing CFA control input files to edit.

Figure 8:
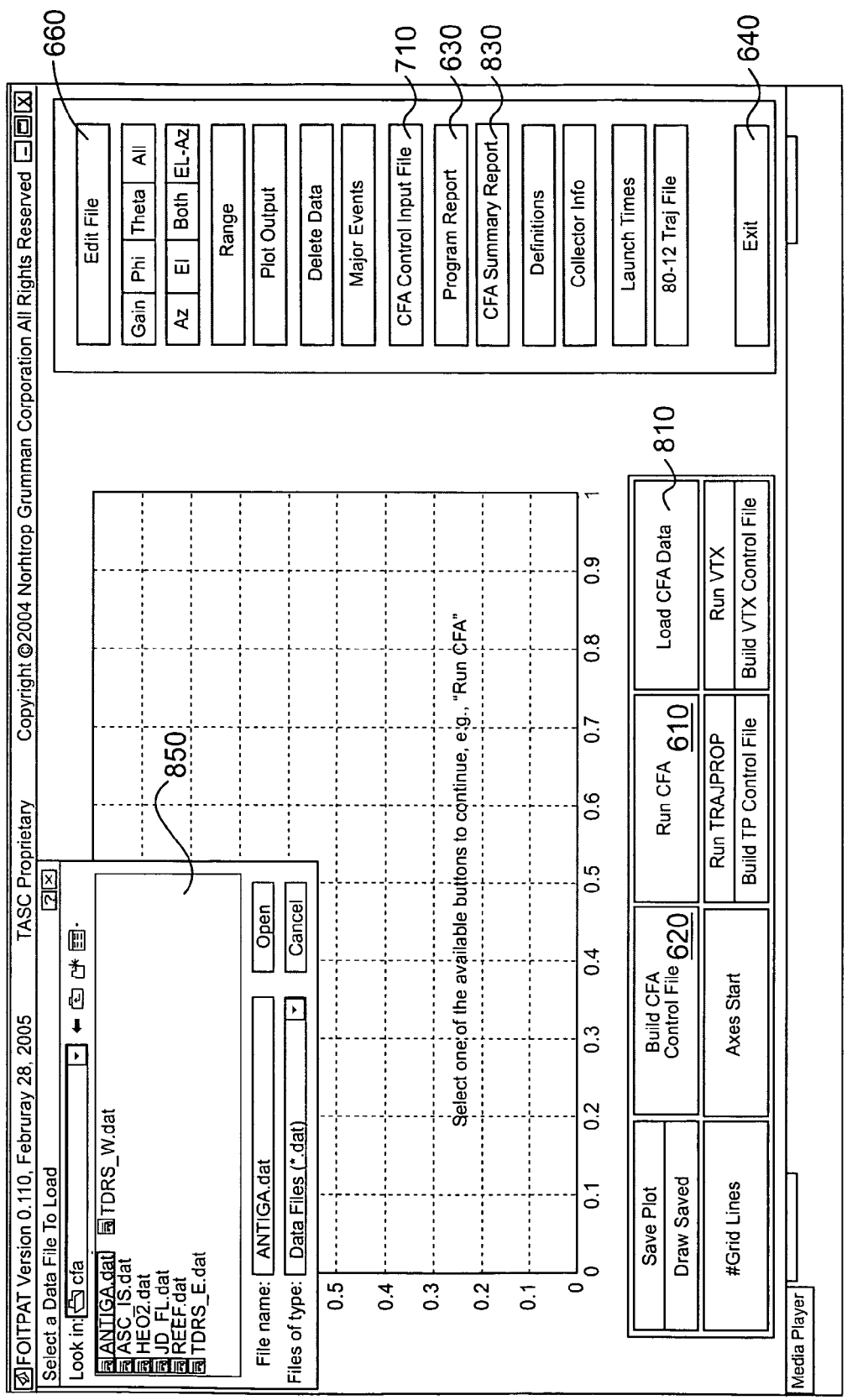

FIG. 8 shows the exemplary user interface 140 with an exemplary CFA data file input selection screen 850. Executing the CFA tool 110 on an input control file generates data files for the appropriate collectors listed in the input control file. To plot one of the collector files (after CFA has been executed), the user may select a "Load CFA Data" button 810. A select file box appears with data files visible. The "CFA Summary Report" button 830 shows the current CFA summary report.

Figure 9:
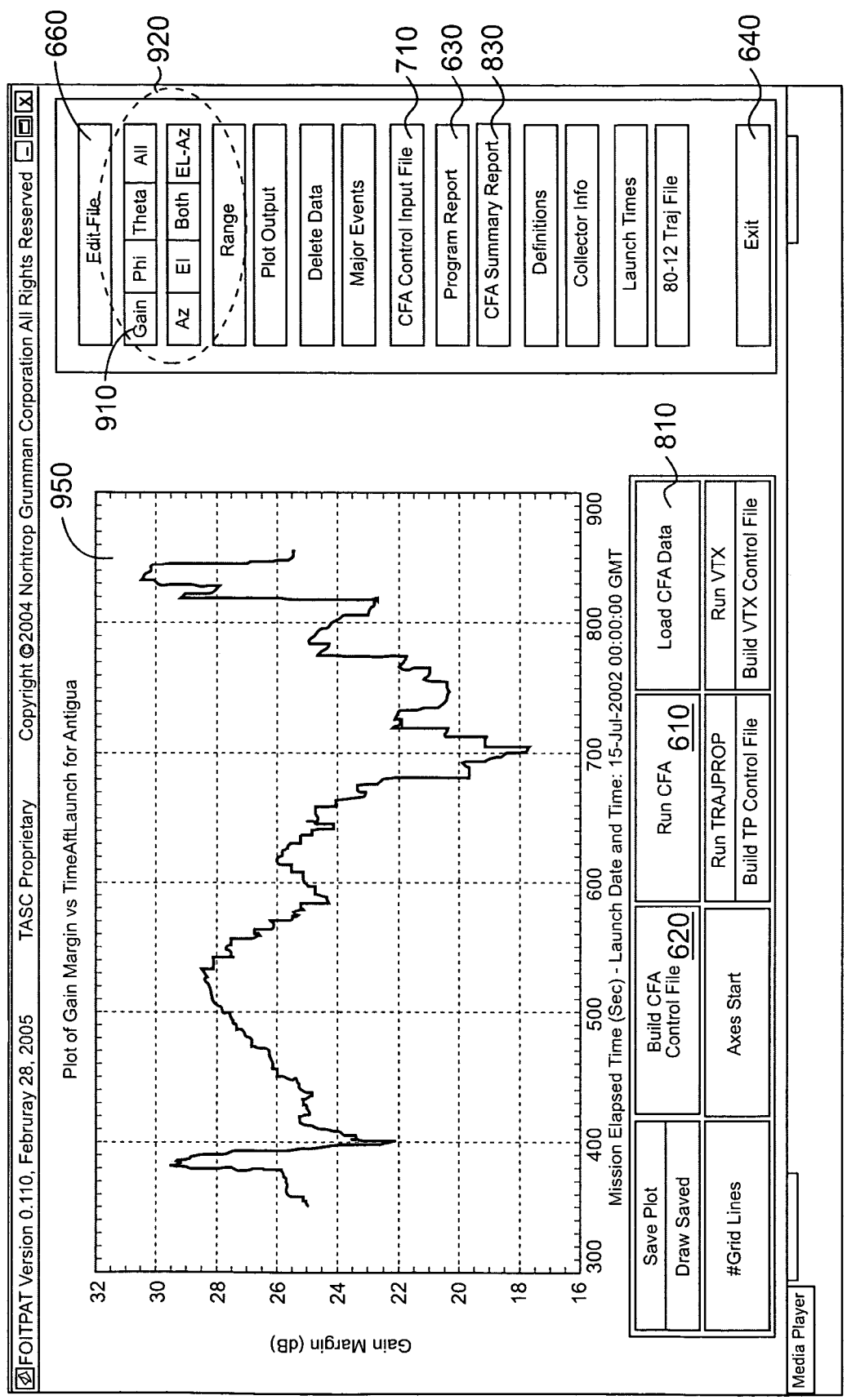

FIG. 9 demonstrates an exemplary screen 950 showing the result of plotting buttons 920 that generate different plots against time after launch. The plotting buttons 920 include "Gain" button 910, "Phi" button, "Alpha" button, "Theta" button, "All" button, "Az" button, "El" button, "Both" button, "El-Az" button, and "Range" button. The "Gain" button 910 plots the gain margin. The "Phi" button plots the "Clock" or "Role" angle measured about the x-axis. The "Alpha" button replaces the "Phi" button in the menu selection when an appropriate analysis mode is being used. The "Alpha" button plots the off bore sight angle of the antenna. The "Theta" button plots the line of sight angle of the vehicle along the positive x-axis. The "All" button plots gain, phi angle and theta angle all on one plot. The "Az" button plots azimuth. The "El" button plots elevation. The "Both" button plots azimuth and elevation on the same plot. The "El-Az" button plots elevation vs. azimuth. The "Range" button plots range. FIG. 9 shows the result of the "Gain" button 910 for the Antigua collector.

Figure 10:
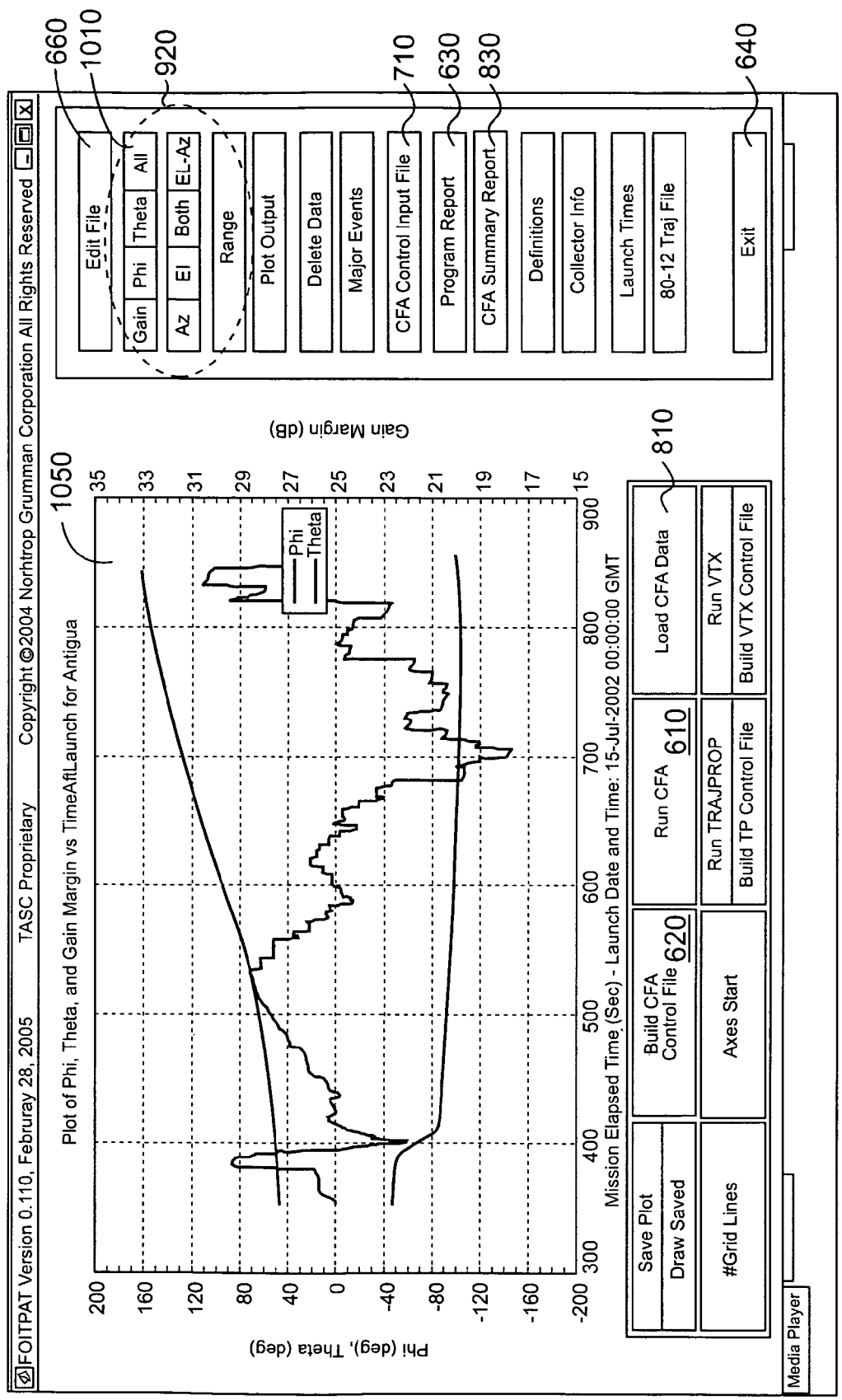

FIG. 10 demonstrates "All" for the Antigua collector that plots gain, phi angle and theta angle. The gain margin is plotted on the right side axis in FIG. 10.

Figure 11:
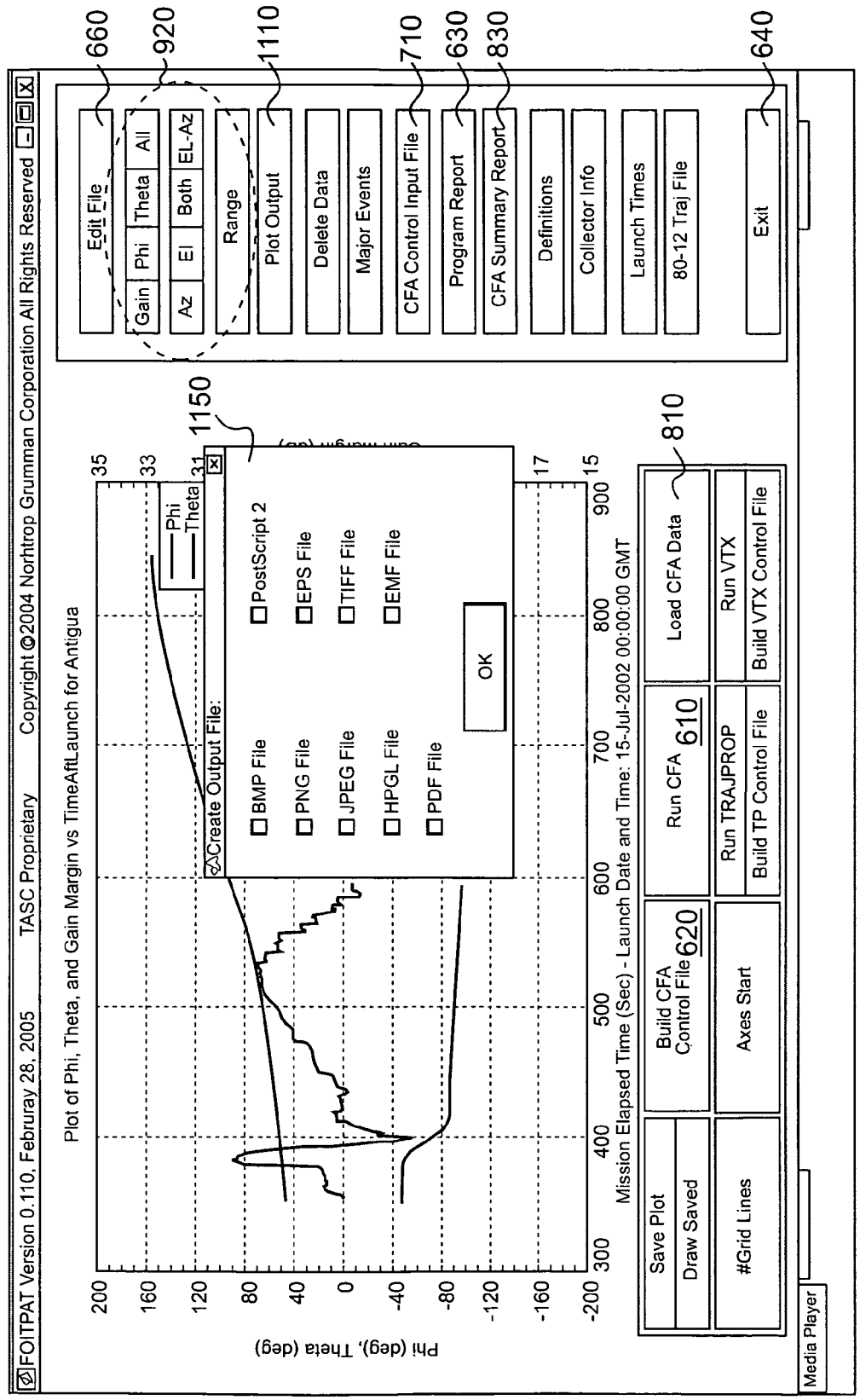
Figure 12:
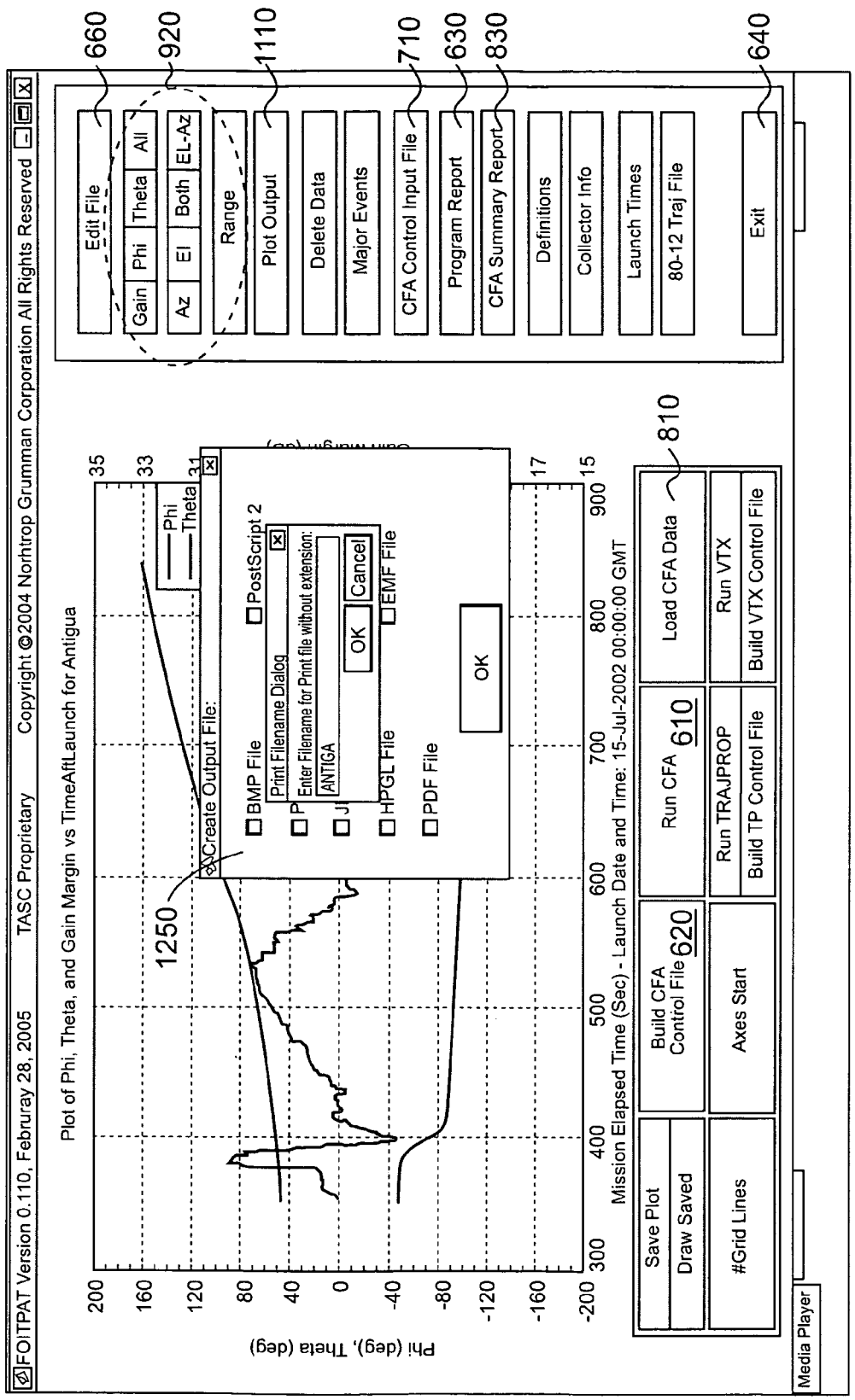

Referring to FIGS. 11 and 12, by selecting a "Plot Output" button 1110, the user can create output files in different formats including, for example, bit-mapped graphics (BMP), portable network graphics (PNG), joint photographic experts group (JPEG), enhanced metafile format (EMF) PostScript (PSC), Hewlett-Packard graphics language (HPGL), Adobe portable document format (PDF), tagged image file format (TIFF), and encapsulated PostScript (EPS). After the "Plot Output" button 1110 is selected, a pop-up screen appears that allows the user to select the appropriate formats for the file. The user can also select the desired orientation, such as portrait, landscape, or rotation. If multiple file items are selected in the pop-up check-off screen, the FOIPAT 100 creates multiple files with the same name but different extensions. The collector name is the default file name. FIG. 11 illustrates how each format is selected. After selecting the file formats that the user wants to generate (in this case only JPEG), the "OK" button may be selected and another popup menu appears in which the orientation of the output is determined, such as portrait, landscape, or rotation. The screen 1250 in FIG. 12 appears allowing the user to give the output file a filename. The file extension generated depends on the file type. For example, .bmp is for BMP file, .png is for PNG file, .jpg is for JPEG file, .hgl is for HPGL file, psc is for Postscript file, eps is for EPS file, tif is for Tiff file, .pdf is for PDF and .emf is for EMF file. When the output is generated, only the data plotted and axes are seen. The buttons and screen controls will not be in the image. The output files are placed in the same directory that the FOIPAT executable is in.

Figure 13:
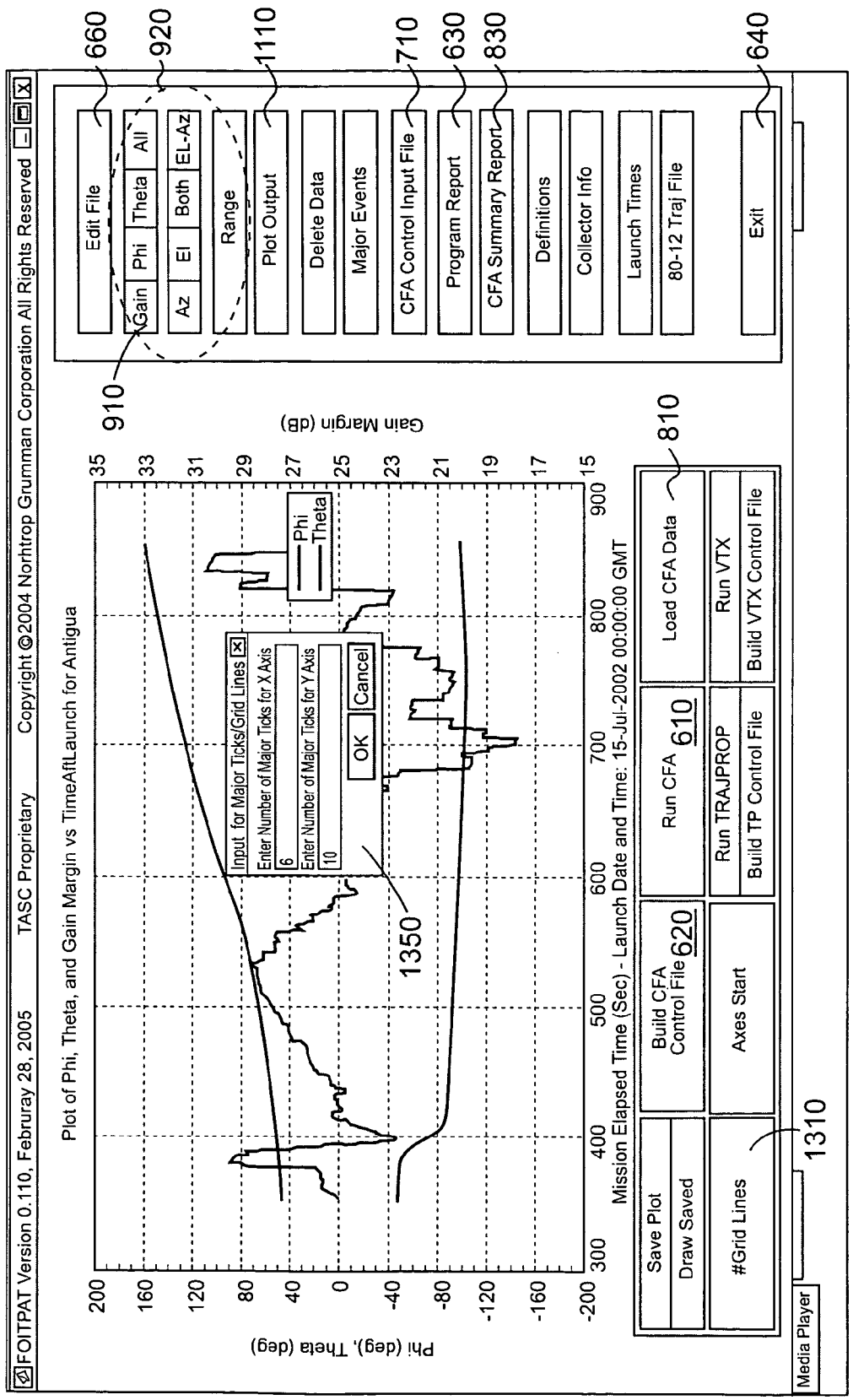
Figure 14:
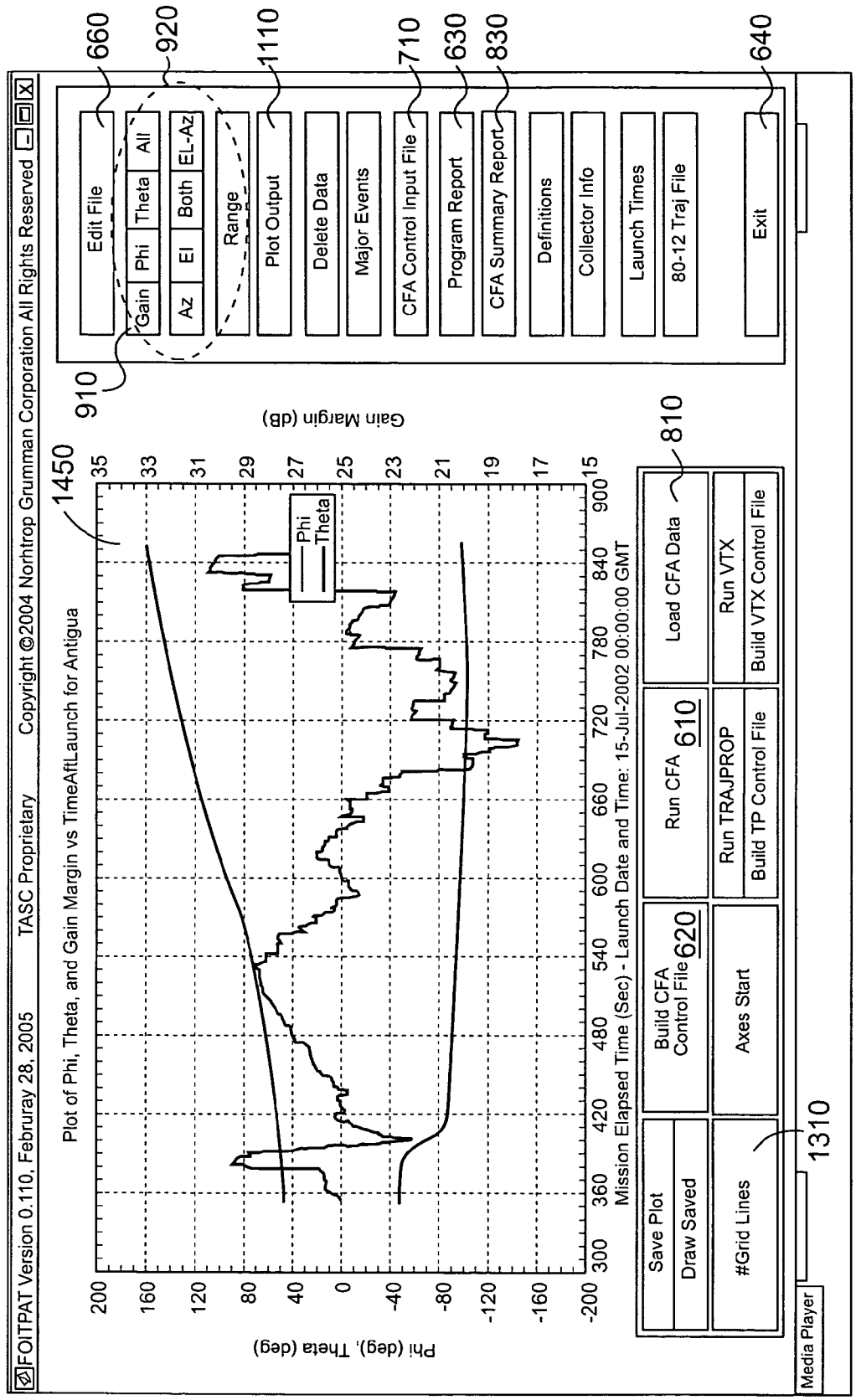

FIGS. 13 and 14 illustrate exemplary screens 1350, 1450 showing the result of a "# Grid Lines" button 1310. The "# Grid Lines" button 13 10 allows the user to change the number of grid lines displayed in the image. A popup menu appears allowing the user to select both y and x-axis number of grid lines. FIG. 13 shows an example where the default value is 6 for x-axis and 10 for y-axis. FIG. 14 demonstrates the results when 10 *x* and *y* grid lines are selected for Antigua data.

Figure 15:
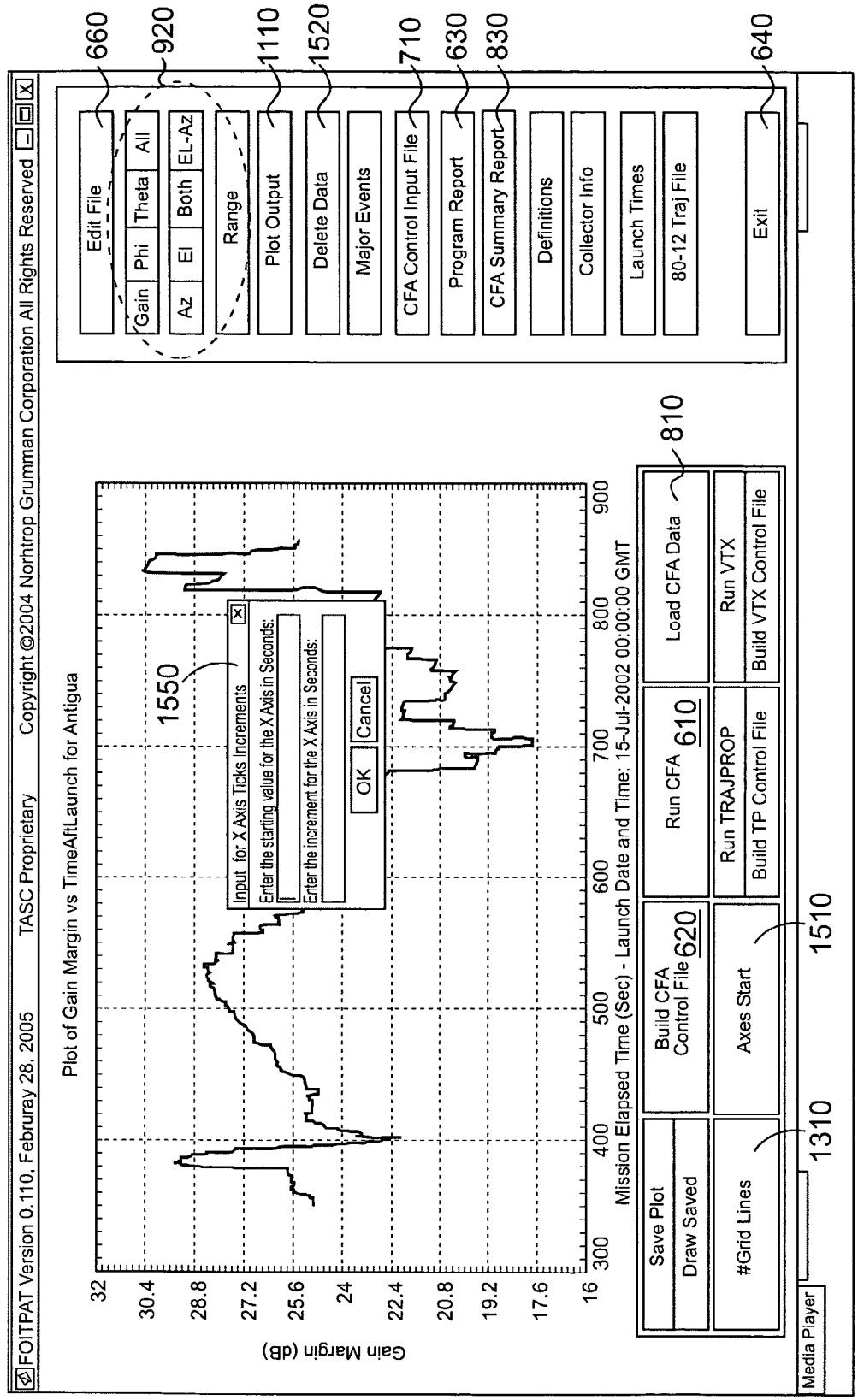

FIG. 15 illustrates an exemplary screen 1550 displayed by selecting a "Axes Start" button 1510. The "Axes Start" button 1510 allows the user to select the starting value and the increment on both the x and the y-axis. FIG. 15 demonstrates the popup screen for setting the starting value and increment for the x-axis. A similar popup screen appears for the y-axis. If the user selects the "cancel" button, the axis will be unchanged. With continued reference to FIG. 15, a "Delete Data" button 1520 allows the user to delete one or more data files created by the CFA tool 110 during execution. When the CFA tool 110 is executed, all existing data files are deleted automatically.

Figure 16:
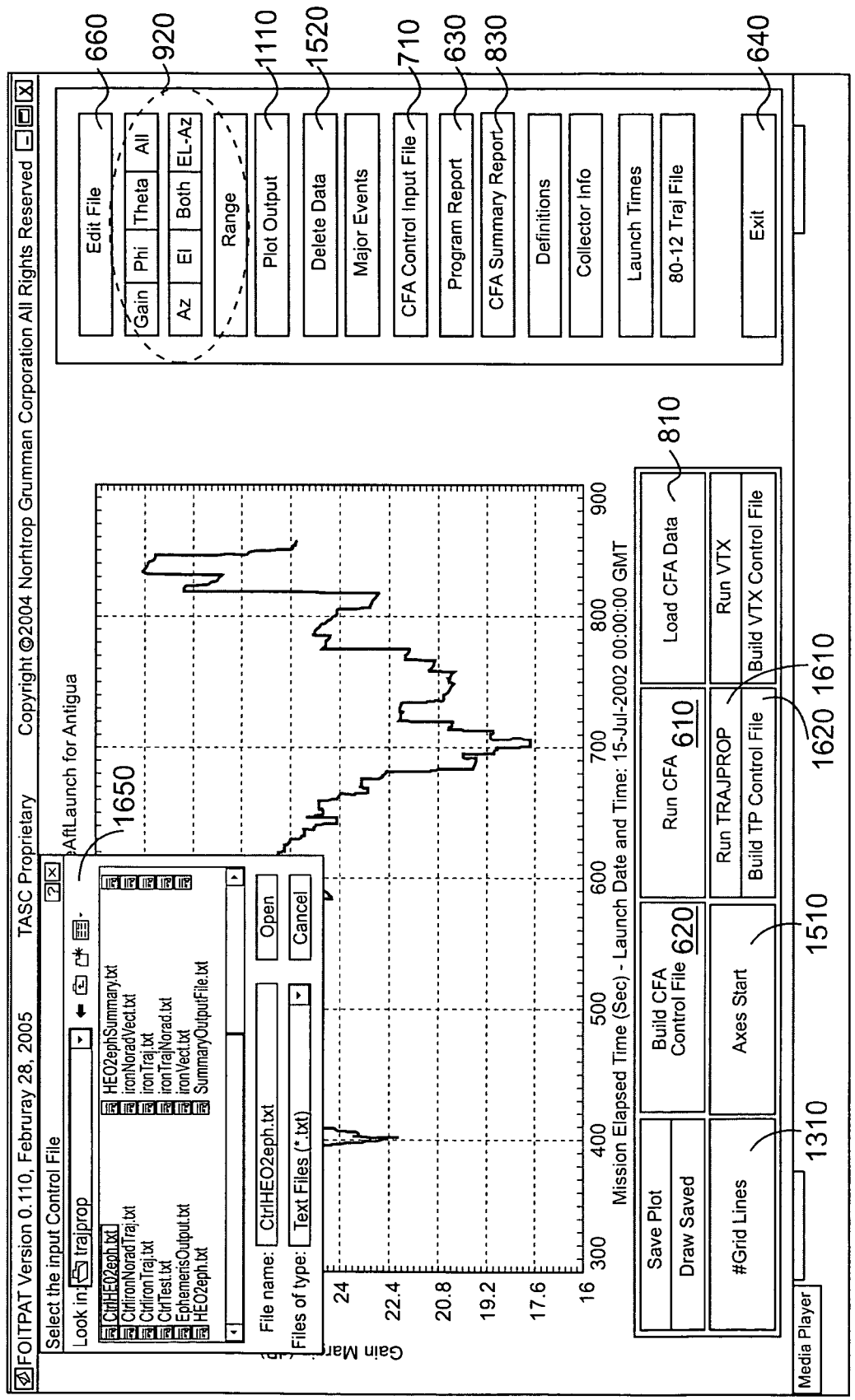

FIG. 16 illustrates an exemplary file selection screen 1650 displayed after selecting a "Run TRAJPROP" button 1610. The "Run TRAJPROP" button 1610 executes the TrajProp tool 130. The "Run TRAJPROP" button 1610 allows the user to select a TrajProp control input file. The user may select the "Program Report" button 630 after running the TrajProp tool 130 to view the results. The output files remain in the TrajProp subdirectory. One of the output files of the TrajProp tool 130 is the STK® formatted ephemeris file that is placed in the STKephem directory. This file can be loaded into STK® to show the plotted orbit of a satellite. Any associated TrajProp files may be placed in the TrajProp directory. After the user selects an input file, the name of the STK® File that will be created is requested. The default name is the ephemeris file name created by the TrajProp tool 130 with STK_appended to the end of the filename. If the file already exists the user is able to cancel the action.

Figure 17:
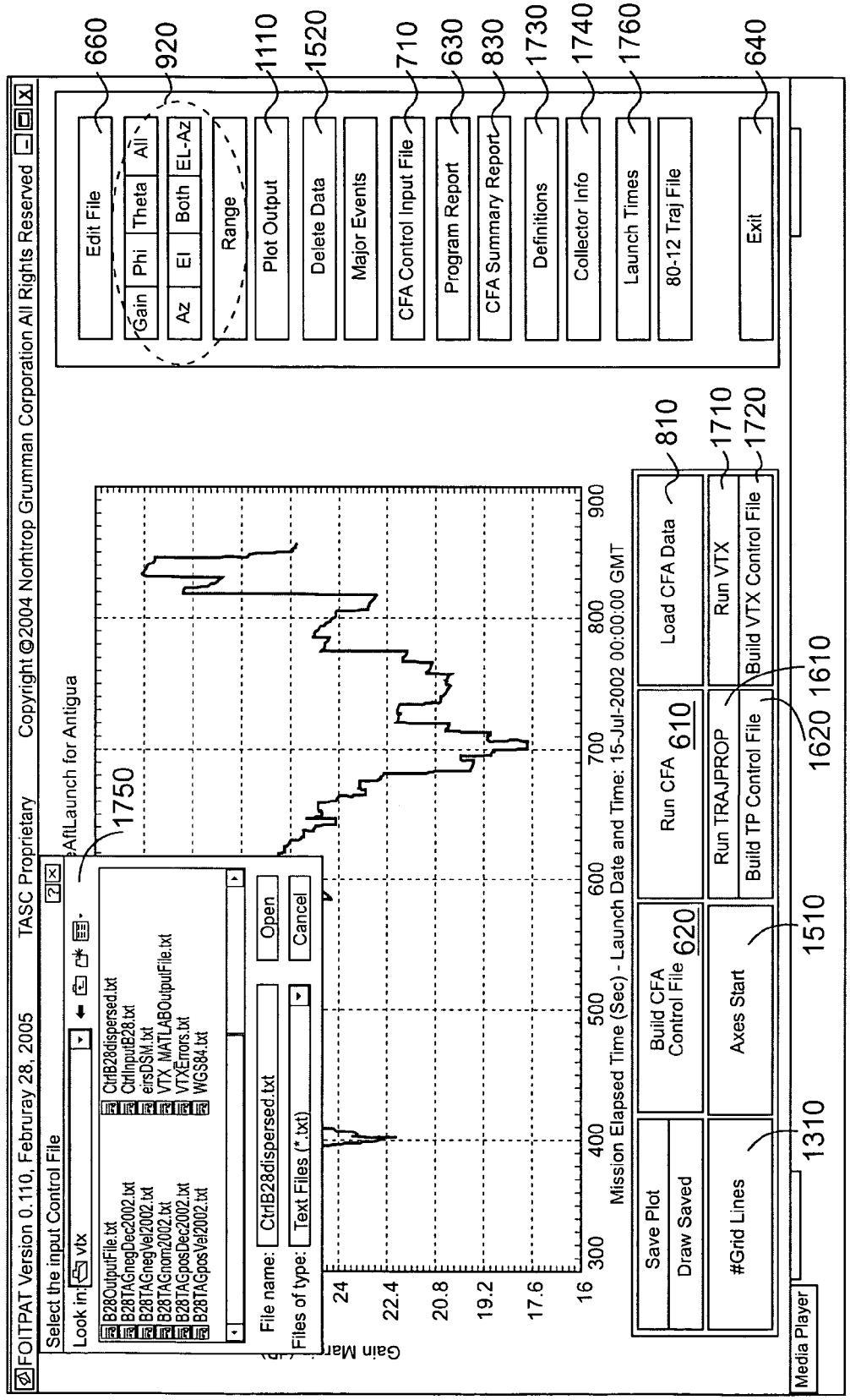

FIG. 17 illustrates an exemplary file selection screen 1750 displayed after selecting a "Run VTX" button 1710. The "Run VTX" button 1710 executes the VTX tool 120. The "Run VTX" button 1710 allows the user to select a VTX control input file. The user may select the "Program Report" button 830 after executing the VTX tool 120 to view the results. Any associated VTX files should be placed in the VTX directory. The output files remain in the VTX subdirectory.

A "Definitions" button 1730 displays useful CFA tool definitions. A "Collector Info" button 1740 displays information on different collectors including, for example, call sign, name, location, Latitude, Longitude, and Altitude. A "Launch Times" button 1760 allows the user to select any of several different zone times (plus GMT and MET) for an x-axis time after launch display.

Figure 18:
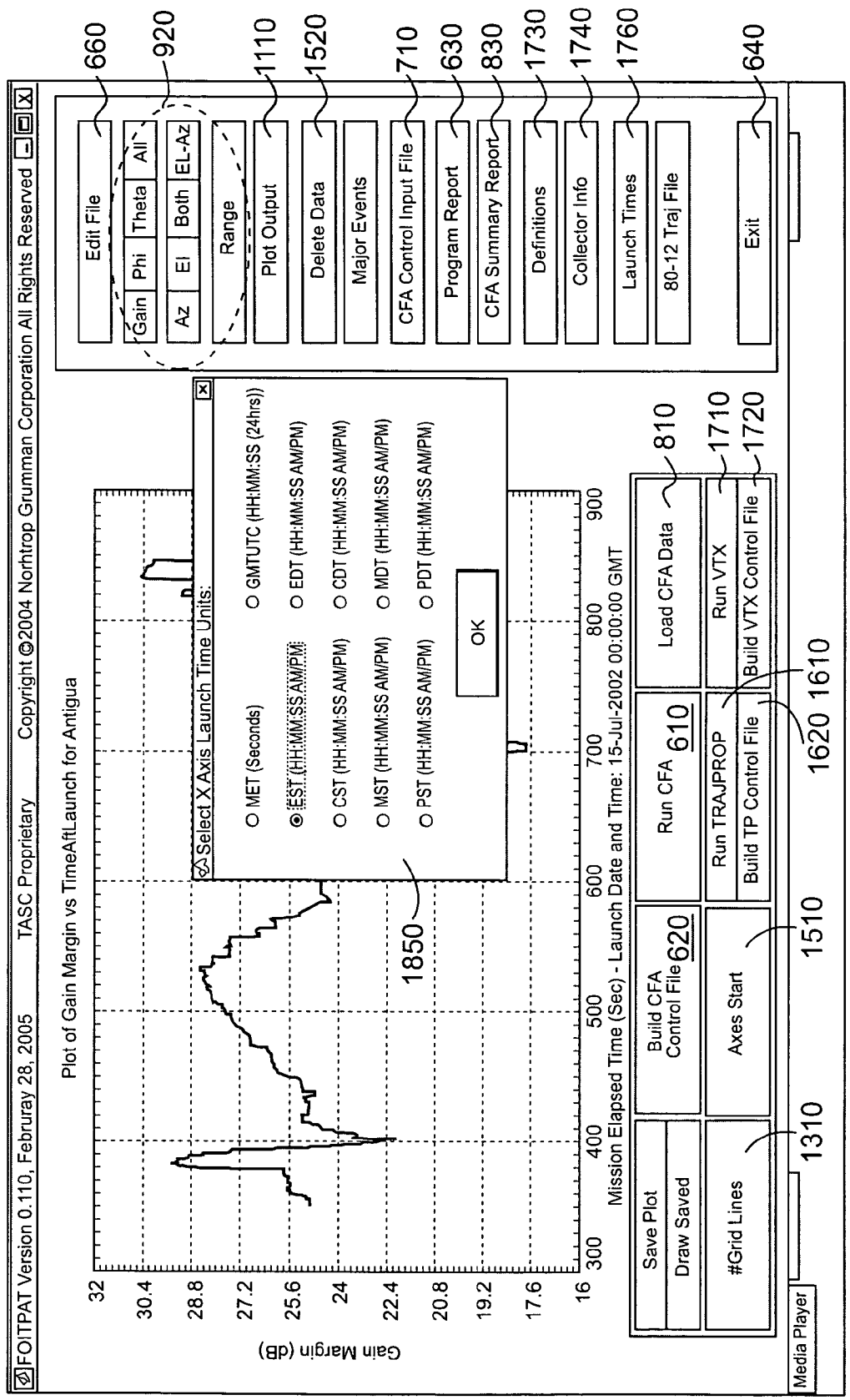
Figure 19:
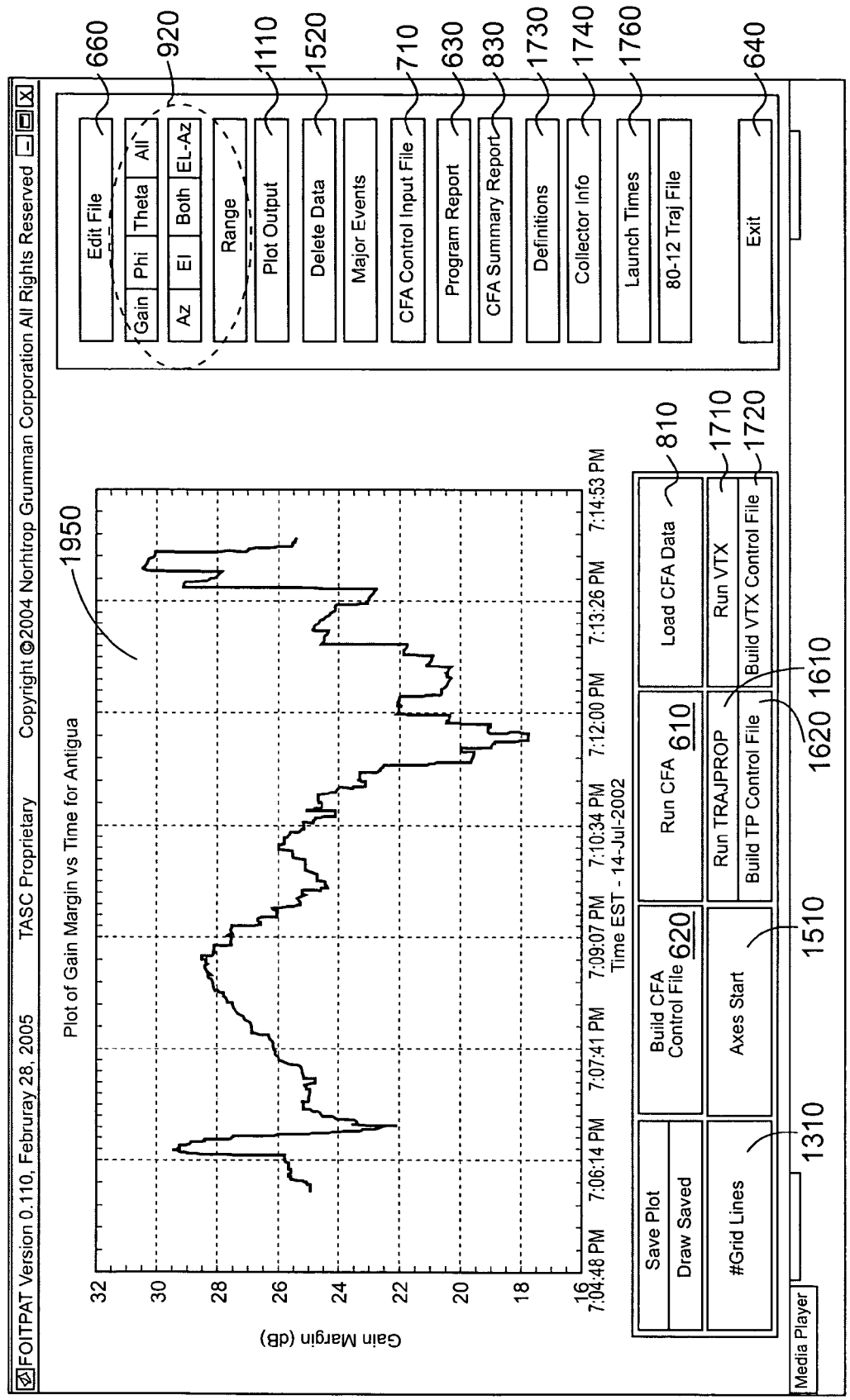
Figure 20:
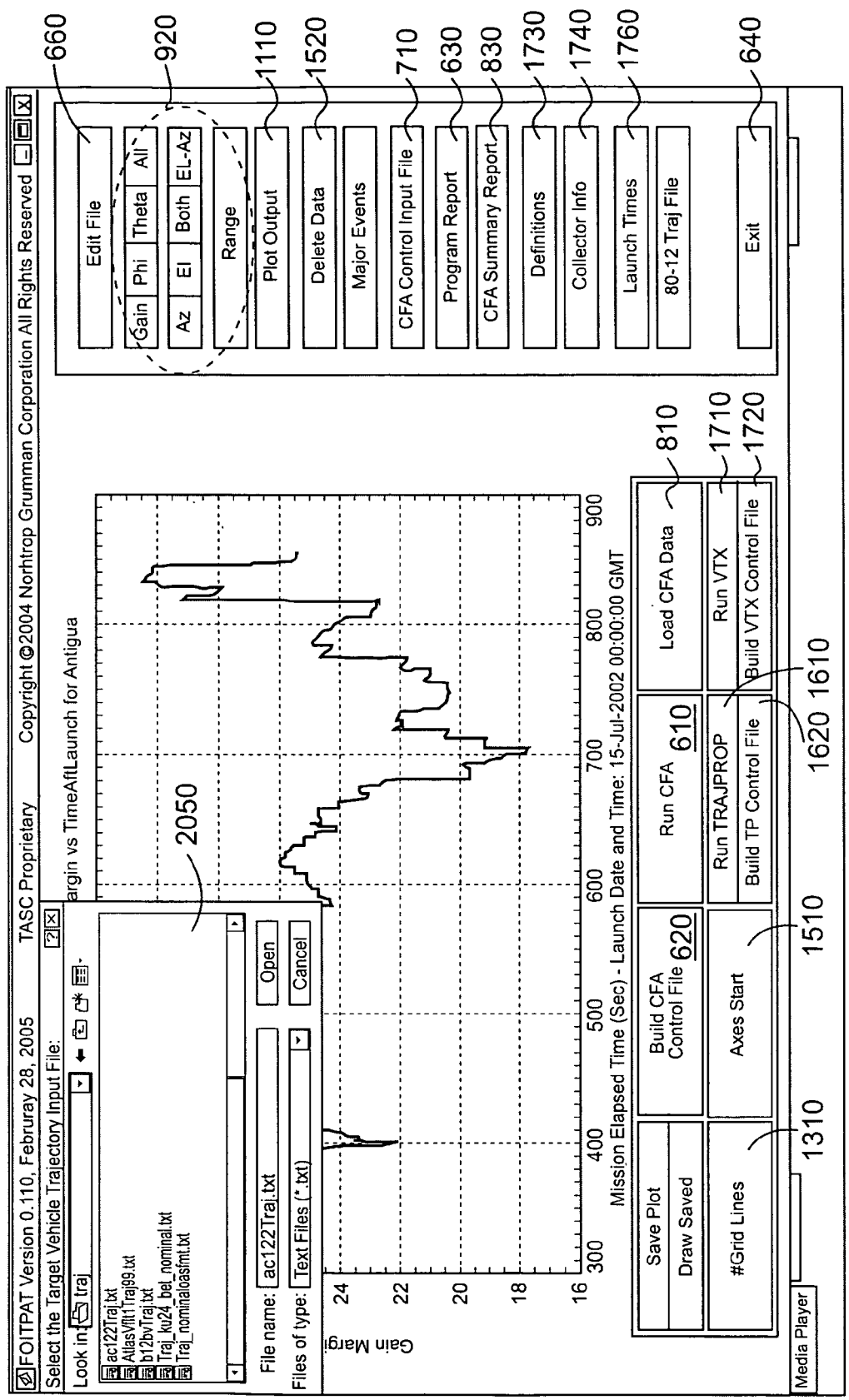

FIGS. 18 and 19 illustrate exemplary screens displayed after selecting the "Launch Times" button 1760. FIG. 18 shows Eastern Standard Time (EST) being selected. FIG. 19 shows EST on the x-axis, screen 1950. The date associated with the plotted time is shown on the x-axis label.

Figure 21:
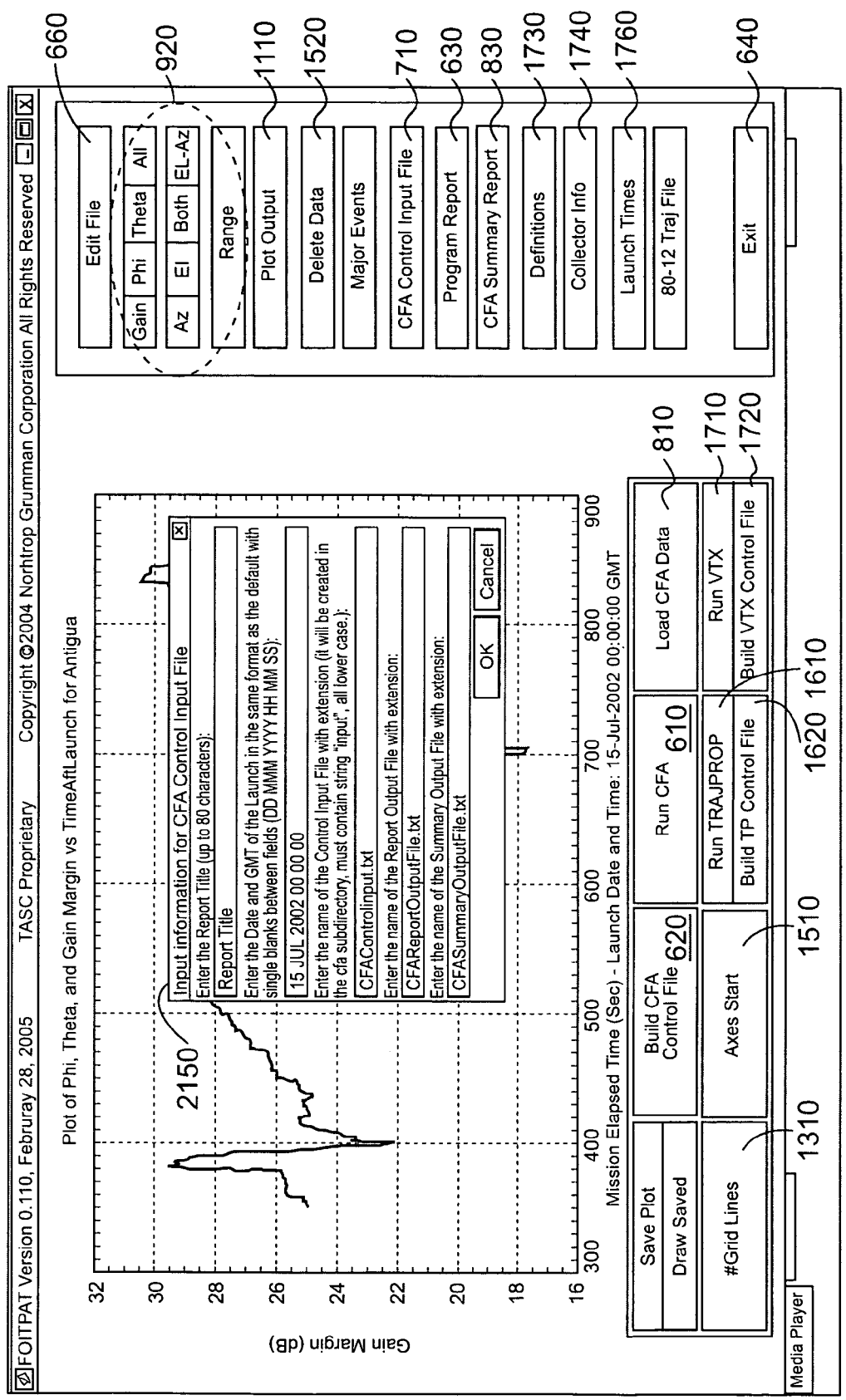

FIGS. 20-23 illustrate exemplary screens 2050, 2150, 2250, 2350 displayed after selecting the "Build CFA Control File" button 620. After selecting MET for Launch Time Axis, the "Build CFA Control File" button 620 allows the user to automatically create a CFA control input file. The user may select (through a pop-up file selection screen) a trajectory file to be used by the CFA tool 110. The trajectory files will be found in the TrajProp directory. After selecting the trajectory file a similar screen appears requesting a specification file. After selecting the trajectory and specification files for the CFA tool 110, a general information screen appears. The user may enter the Report Title, Launch Date and Time (in the appropriate format), Control File name, Report File name, and Summary File name, or select the defaults. FIG. 21 illustrates a screen 2150 for such selections. Next, the collector selection screen appears. The user may select collectors from the list box and default values for, for example, G/T, Antenna Gain, and Bandwidth. The user may either accept the default values or change them to another appropriate value.

Figure 22:
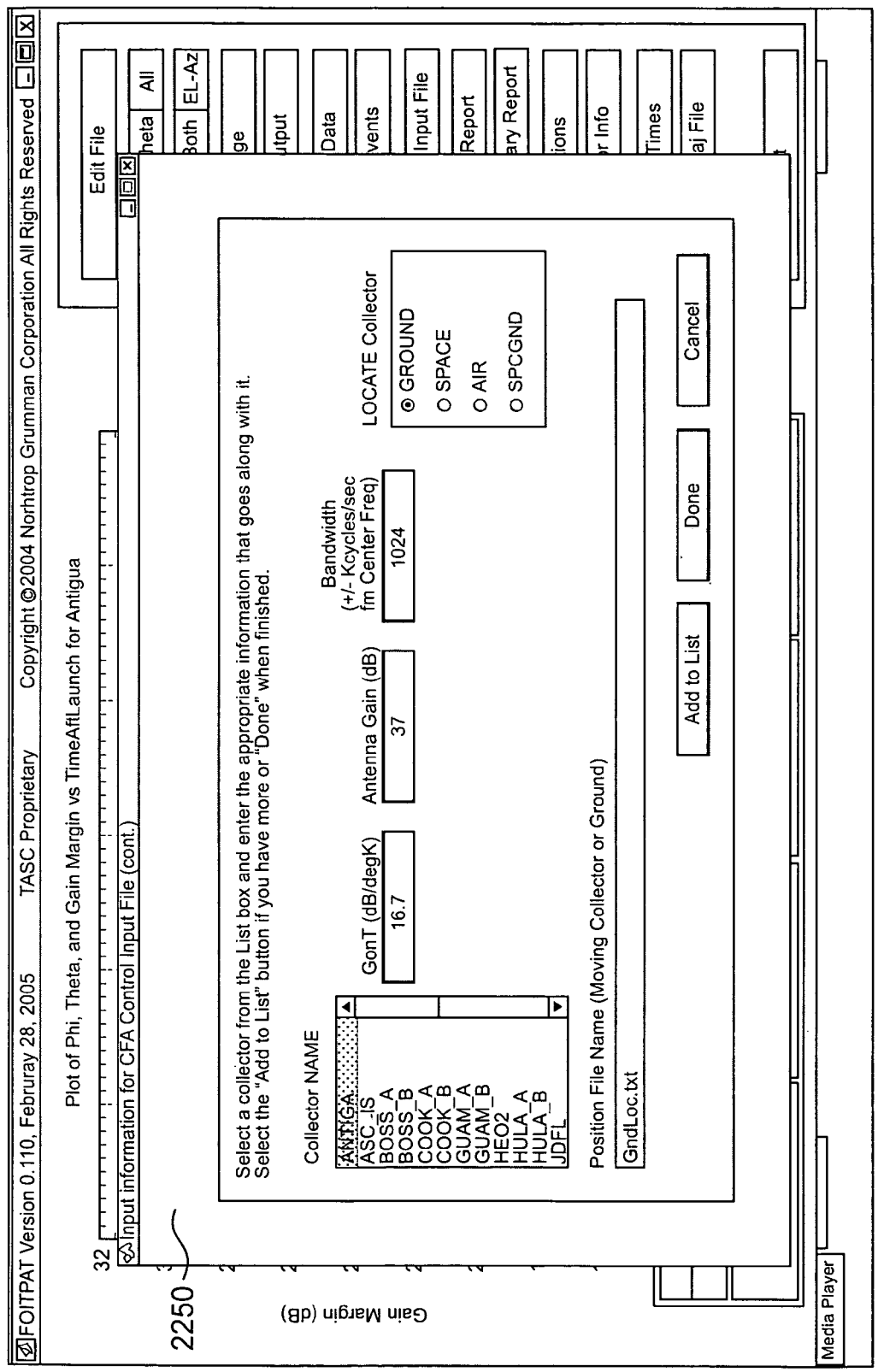

The user may select an "Add to List" button in FIG. 22 if the collector has the desired values. The selection of the "Add to List" button will add that collector to the list of collectors that the CFA tool 110 will use for its analysis. After adding a collector, the user may select it again with different default values or select another collector and its associated default values. Once all the collectors are selected, the user may select the "Done" button in FIG. 22 to go on to the next step.

Figure 23:
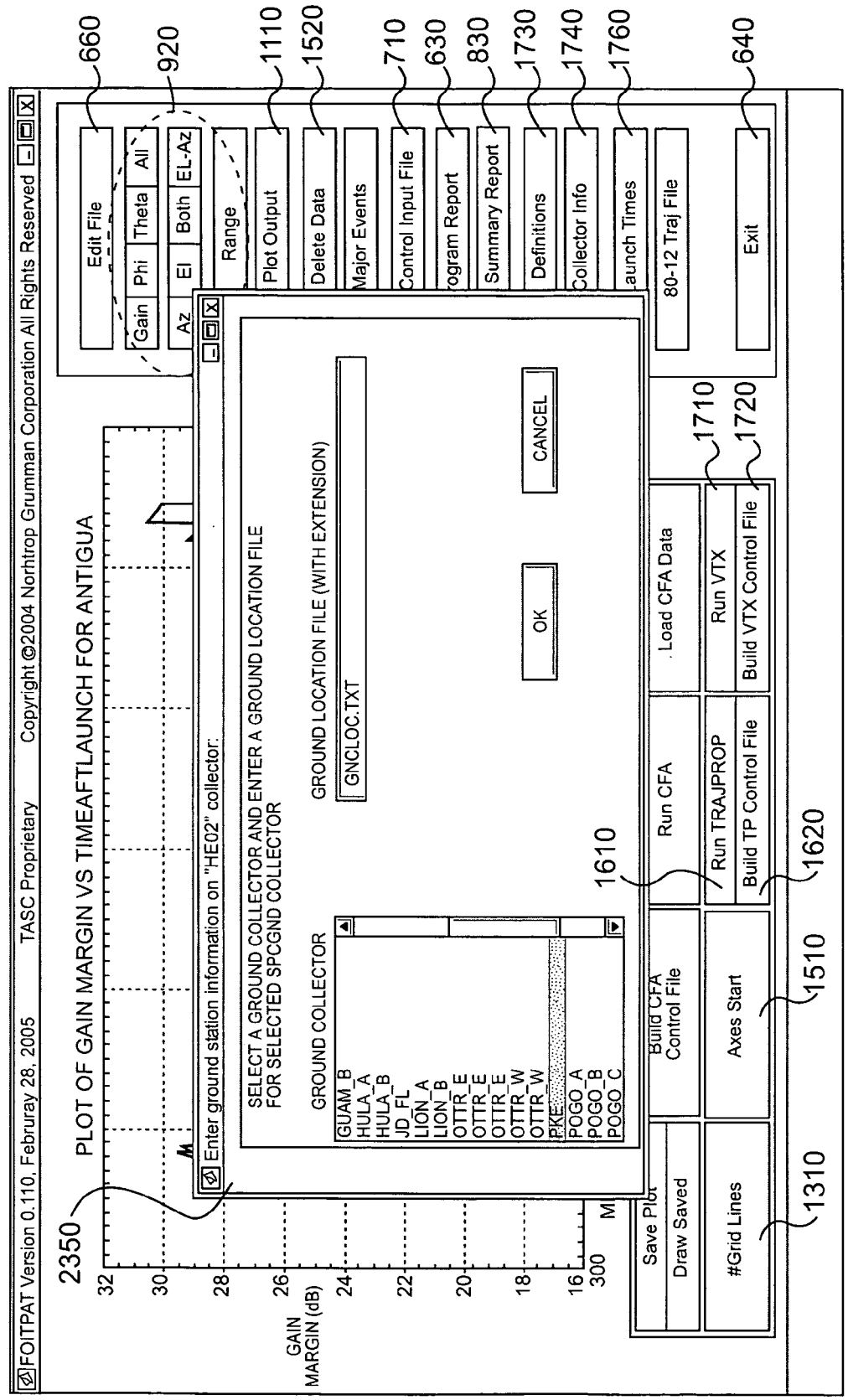

If any space ground collectors (SPCGND) are chosen during the initial selection process, an additional screen appears for each SPCGND collector, requesting that a ground collector be selected. FIG. 23 shows that "HEO2" requires a ground collector.

Figure 24:
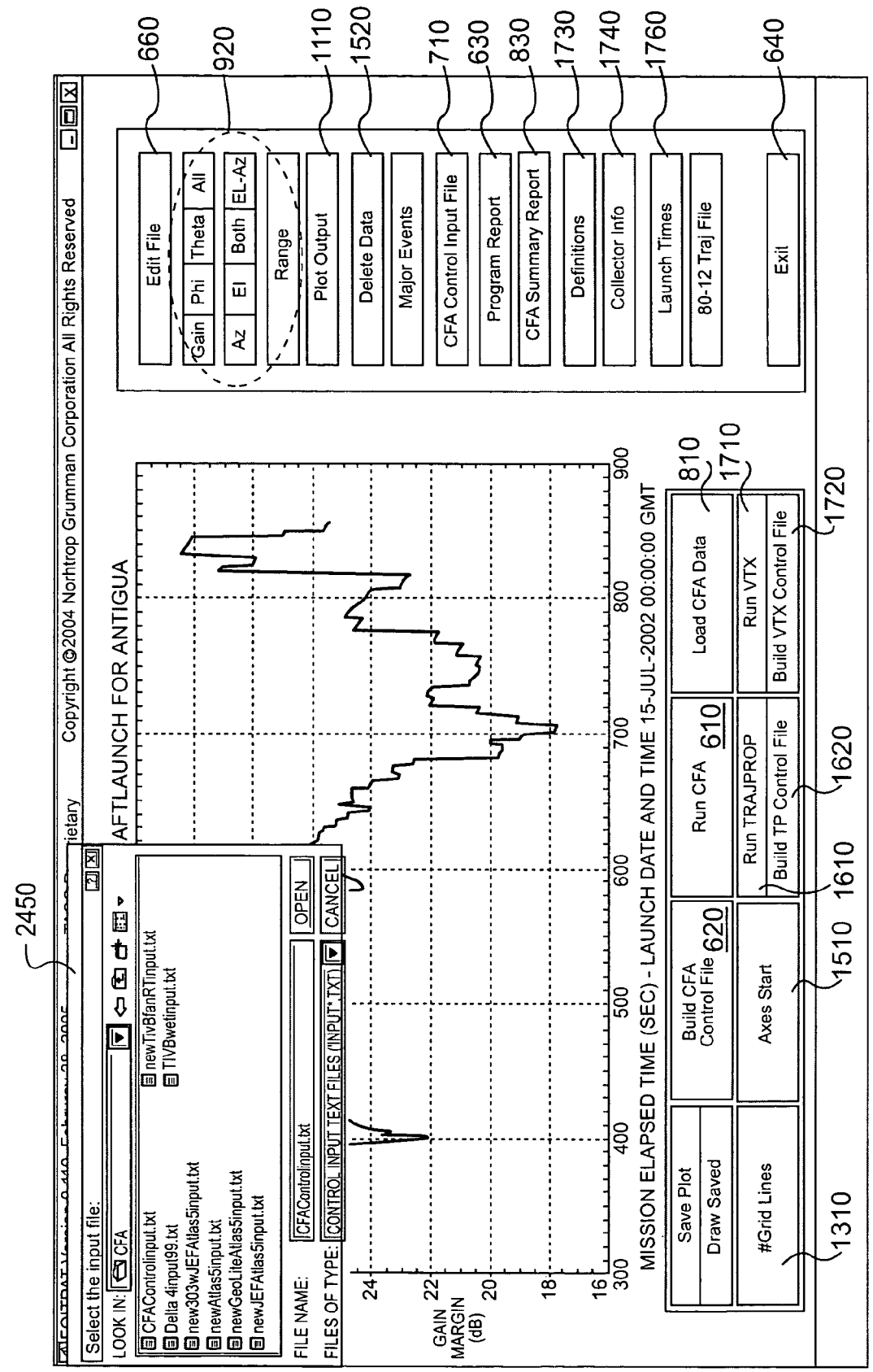
Figure 25:
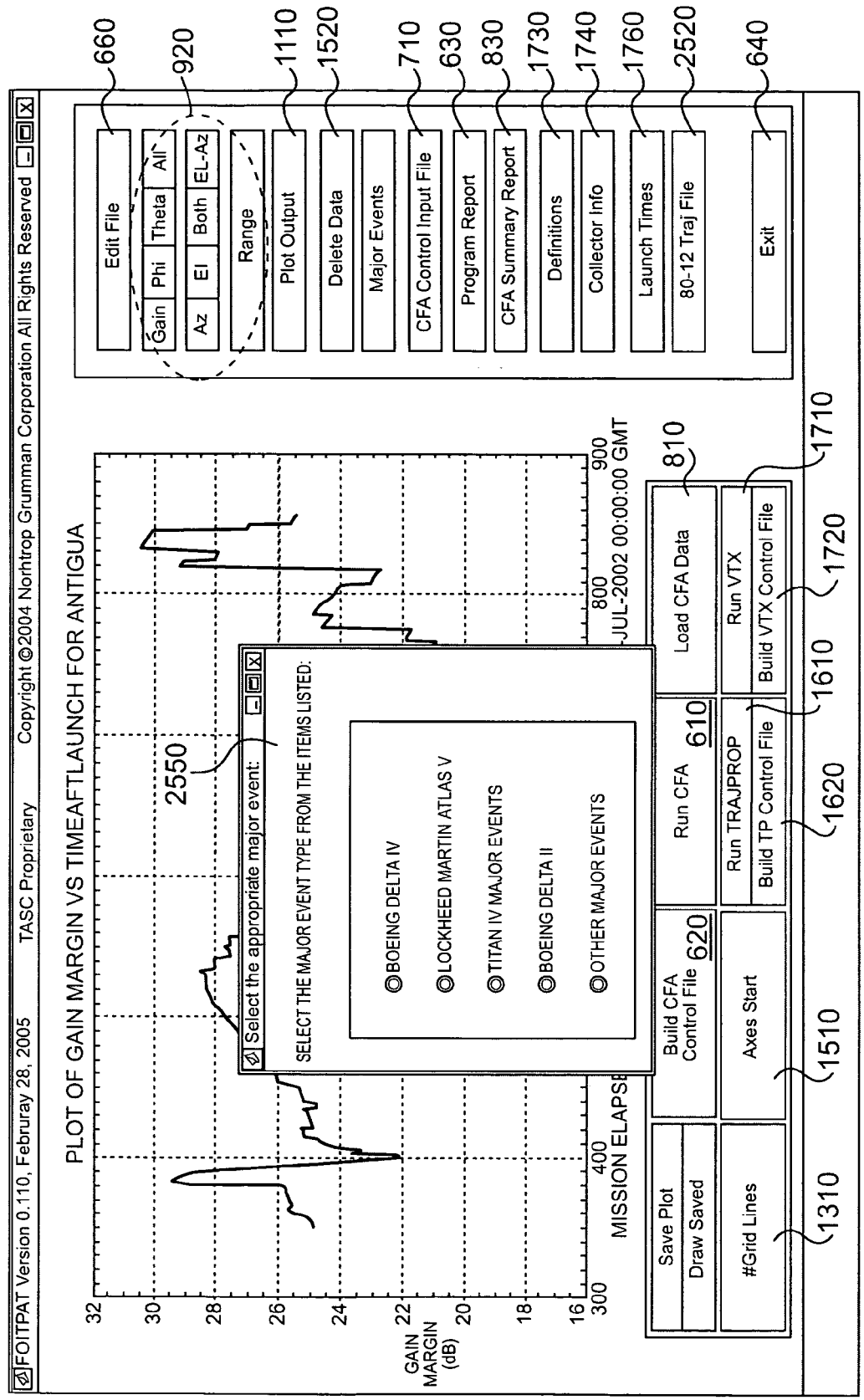
Figure 26:
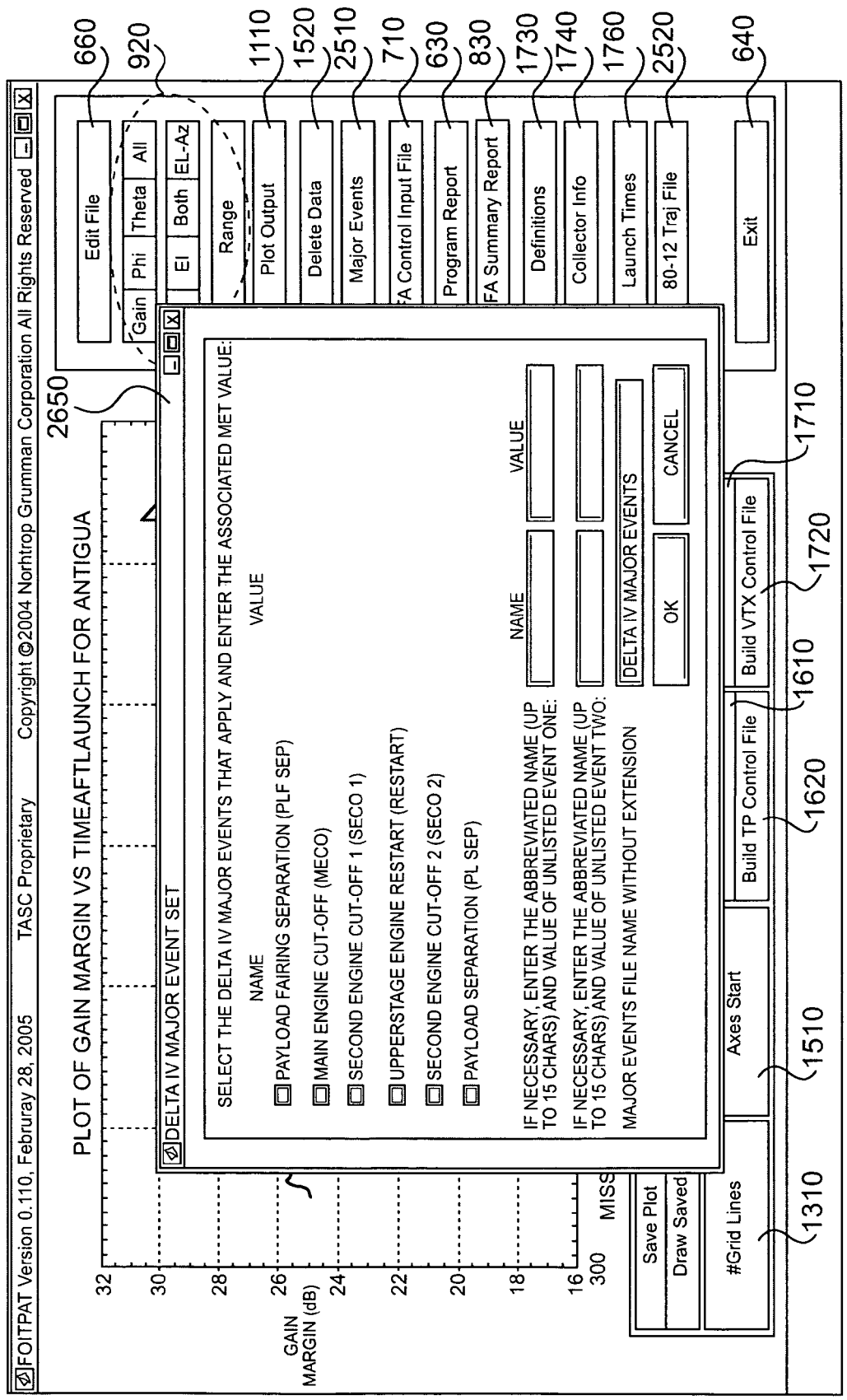

FIG. 24 illustrates an exemplary file selection screen 2450 that tests the newly created control file. The user may select the "Run CFA" button 610 and select the control file name that the user inputs in the initial screen of the control file creation process. In the example of FIG. 24, the default name "CFAControlInput.txt" is used. The user may select this file and run the CFA tool 110.

The "Build TP Control File" button 1620 allows the user to go through a series of screens and construct a TrajProp Control File. The "Build TP Control File" button 1620 generates a TrajProp control file and places the file in the TrajProp directory. Any required files should be in the TrajProp directory before execution of the TrajProp tool 130. One exception is 2 line ElSet files, which are placed in the ElSets directory. The control file generated is placed in the TrajProp directory.

The "Build VTX Control File" button 1720 allows the user to go through a series of screens and construct a VTX Control File. Any required files are placed in the VTX directory. The "Build VTX Control File" button 1720 generates a VTX control file and places the file in the VTX directory.

The "80-12 Traj File" button 2520 (shown in FIG. 25) allows the user to convert from an 80-12 formatted file to a trajectory file. Two formats exist for the 80-12 files: one with comma separated data and four columns of information; and another with space separated data with six columns of information. The FOIPAT tool 100 converts both formats quickly and automatically. Specifically, the FOIPAT tool 100 checks the first line of the file. If commas exist in the first line, the FOIPAT tool 100 reads in the comma-separated version. The output is the same for both versions. The name of the trajectory file is "Traj_" concatenated to the front of the original file name.

FIGS. 25-28 illustrate exemplary screens 2550, 2650, 2750, 2950 displayed after selecting a "Major Events" button 2510. The "Major Events" button 2510 allows the user to plot annotated vertical lines for an assortment of major events. If the user selects the "Major Events" button 2510, he or she is allowed to select any one of several sets of major events, such as Boeing Delta IV, Lockheed Martin Atlas V, Delta II, Other, or Titan IV. After selecting an event type, a pop-up menu appears asking if the user wants to read the events from a file. The events saved in the file are displayed on the current plot. For example, if the user selects the "Boeing Delta IV" major event, the user will only be able to read in Delta IV files. If the user attempts to read in an Atlas V or Titan IV file, the user will get an error message. If the user chooses not to read the events from a file, the user will see a pop-up screen showing the existing Delta IV events plus two unspecified events, shown in FIG. 26. An "Other Major Events" button allows the user to enter up to ten user-defined events.

Figure 27:
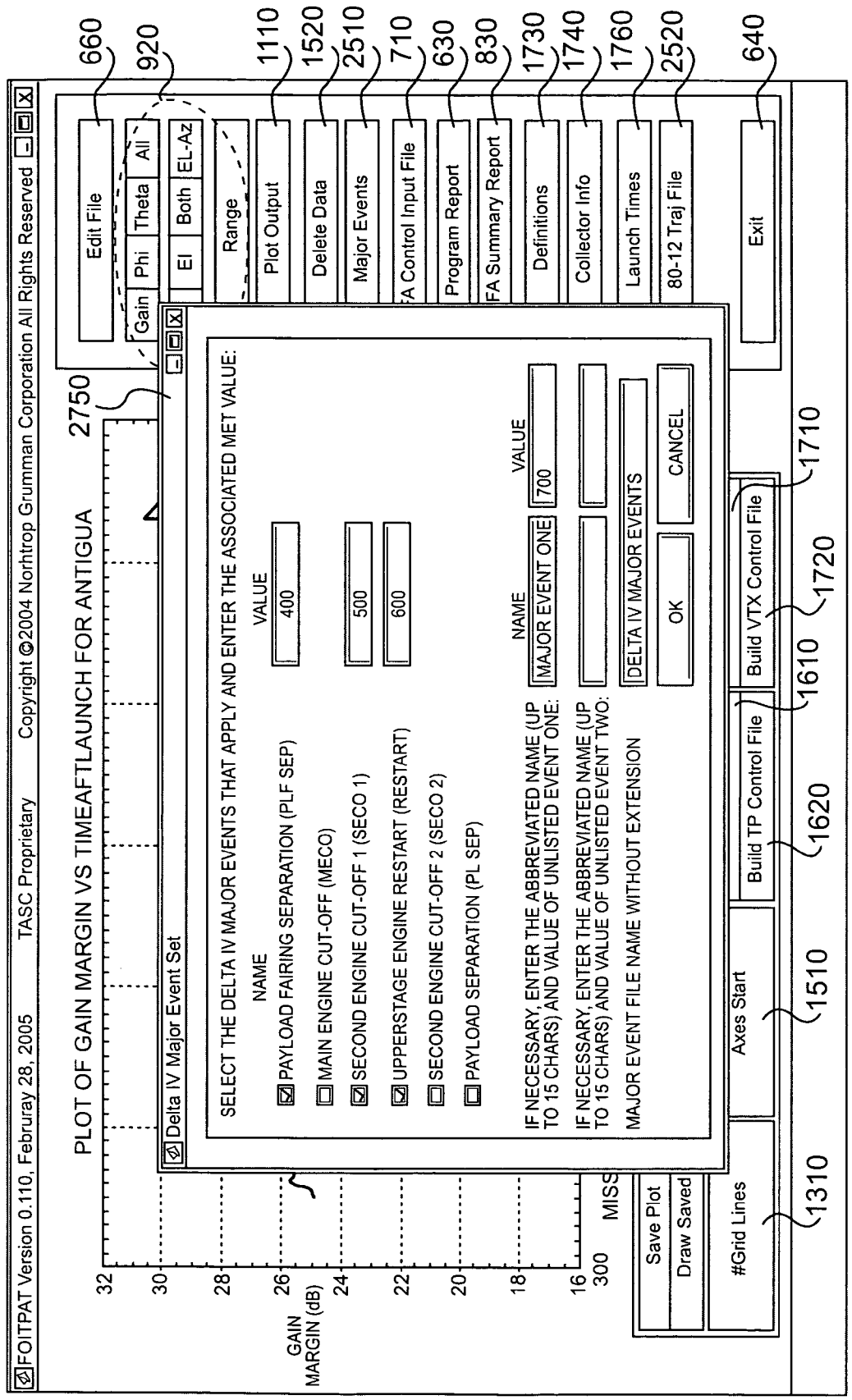
Figure 28:
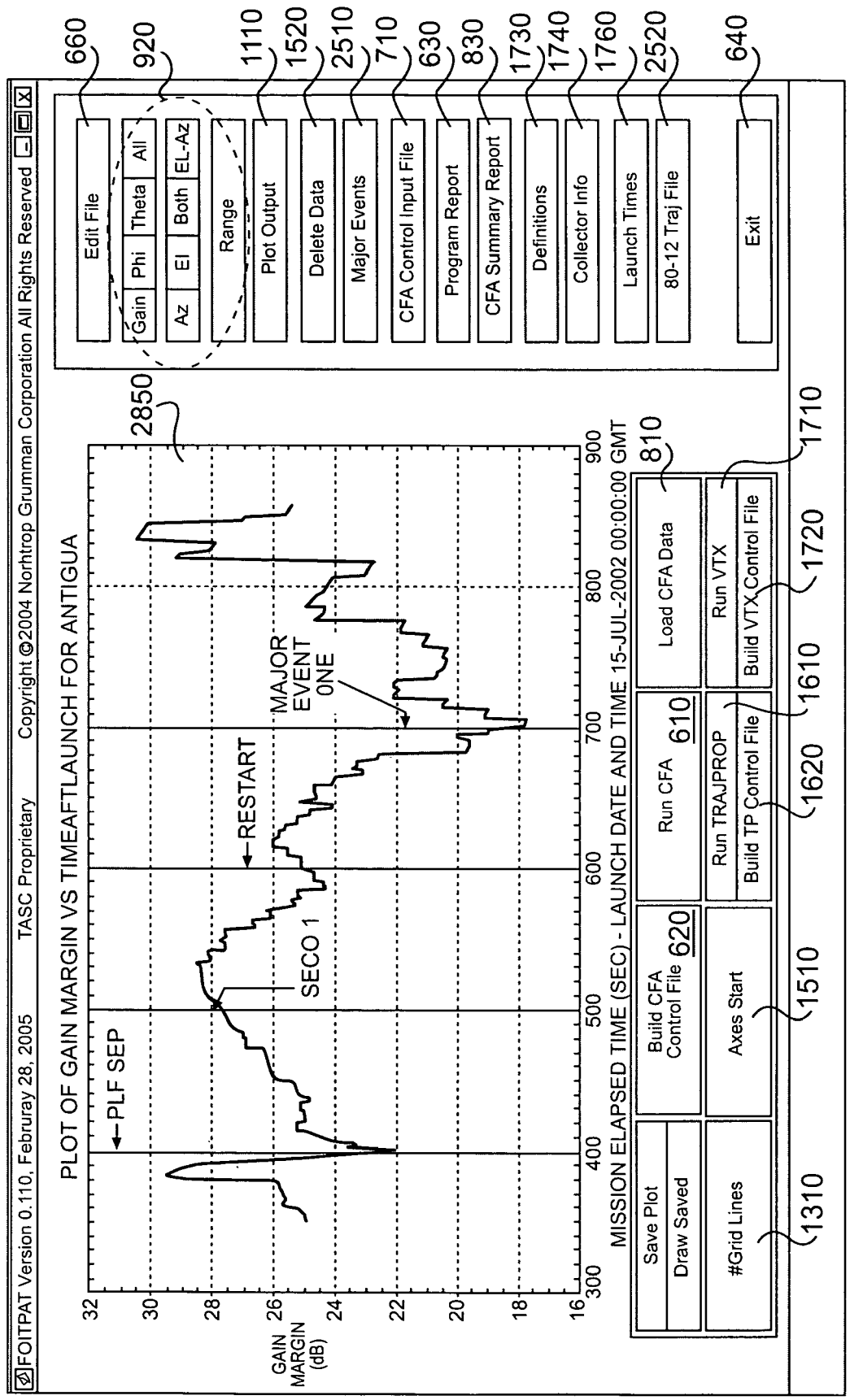

After a major event is selected, a "Value Edit Box" appears allowing the user to enter a value. The user may enter unlisted major events of, for example, up to 15 characters, in several locations and place them on the screen. FIG. 27 shows three listed major events and one unlisted major event with values entered. FIG. 28 shows four major events plotted with vertical lines on the screen 2850.

Figure 29:
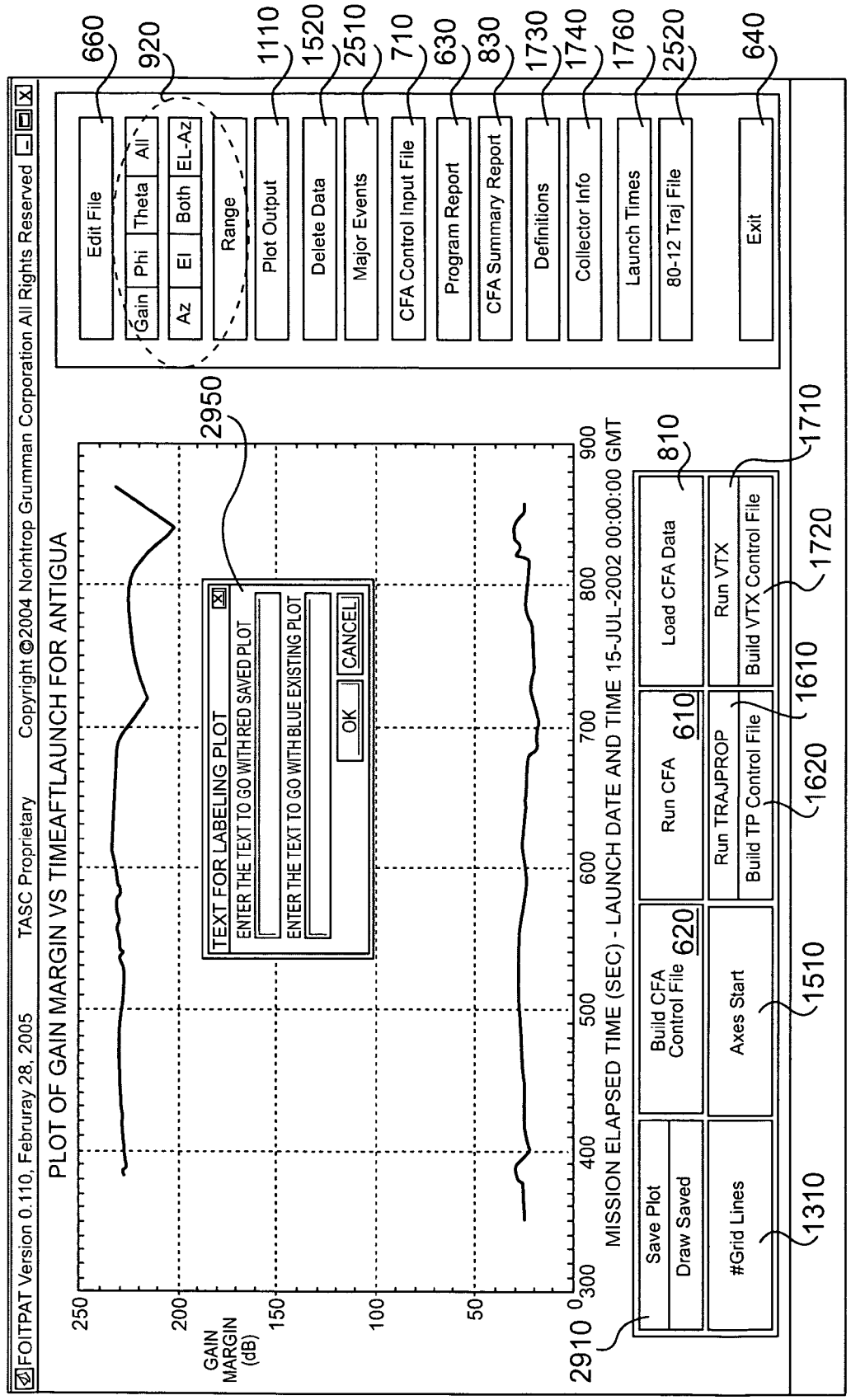

FIG. 29 illustrates an exemplary screen 2950 displayed after selecting "Save Plot" and "Draw Saved" buttons (collectively 2910). The "Save Plot" and "Draw Saved" buttons 2910 allow the user to compare the gain, phi/alpha, or theta plots with a subsequent execution of the CFA tool 110. For example, if the user has pre- and post-flight trajectory and spec files for a particular collector, the user can load the pre-launch collector data, plot its gain, save it, and then run the CFA tool 110 on the post-launch collector data, plot its gain, and plot the saved gain on the same plot, thereby allowing the user to compare the two launches. This procedure can be performed in seconds. The text box shown in FIG. 29 will be displayed allowing the user to label the saved and existing plot lines. For example, the saved plot line may be red and the existing plot line may be blue. After the user enters the text for the labels, a crosshair appears allowing the user to place the text for the red plot line and then the blue existing plot line.

Figure 30:
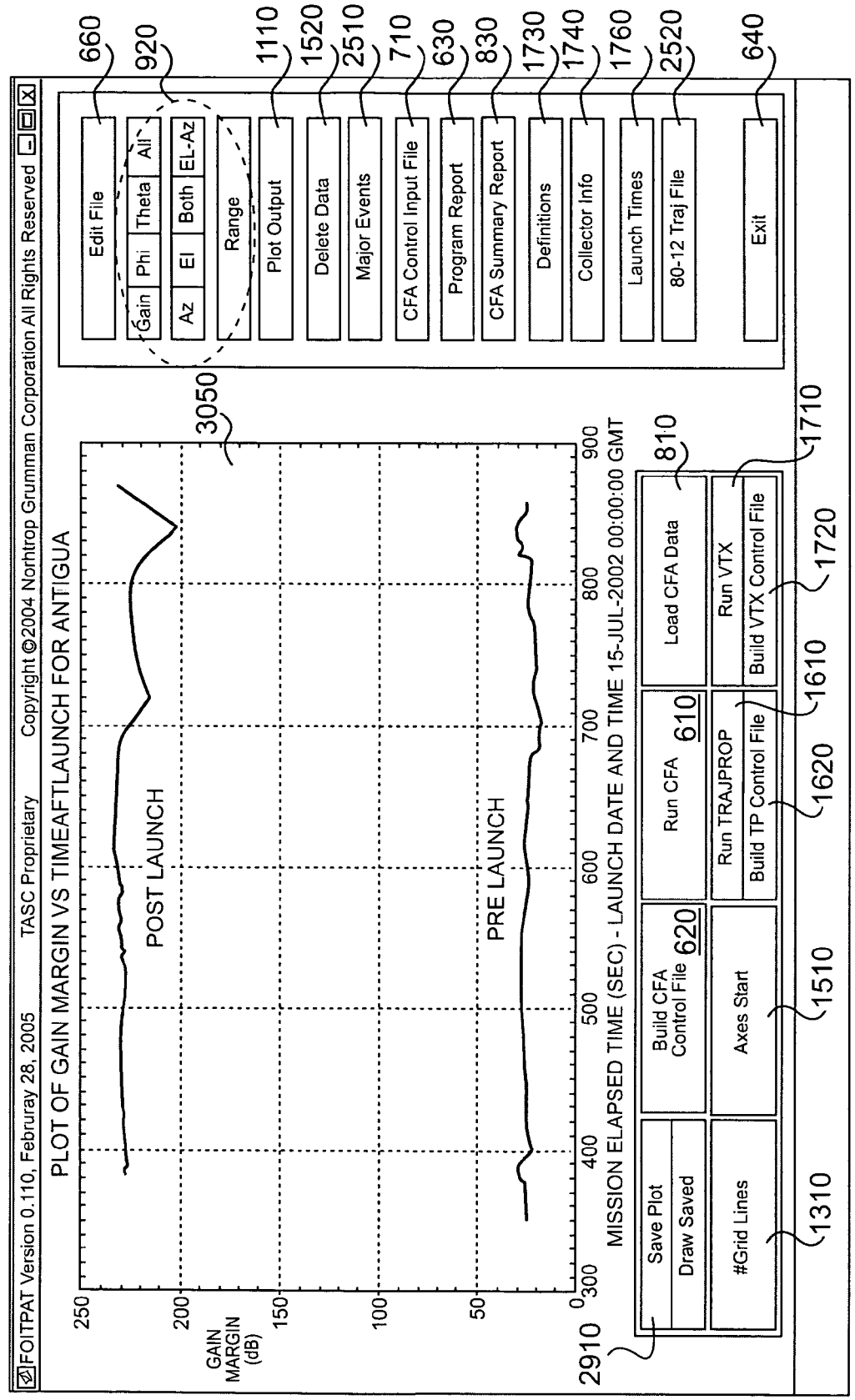

FIG. 30 shows the result of two plots being drawn after labeling the lines. The "Exit" button 640 exits the application. The apparatus and method for providing flight operations integrated planning and analysis tools may be used for a wide range of unmanned systems that are dependent on telemetry for tracking, guidance, and control.

Figure 31:
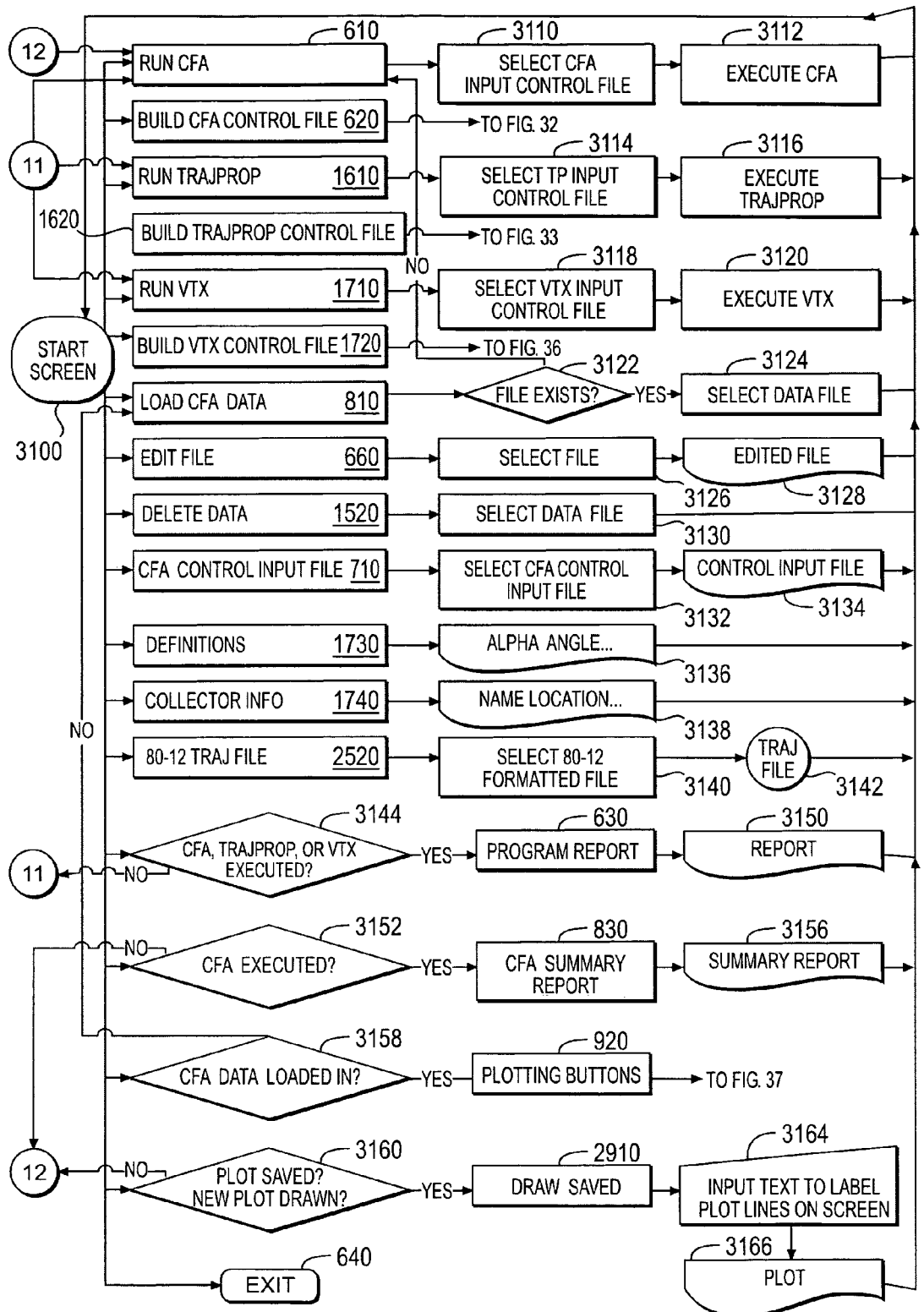

FIGS. 31-37 illustrate execution flow charts for the exemplary FOIPAT. Referring to FIG. 31, a start screen 3100 includes multiple buttons for a user to select. The buttons, described with respect to FIGS. 6-30, include the "Run CFA" button 610, the "Build CFA Control File" button 620, the "Run TrajProp Control File" button 1610, the "Build TrajProp Control File" button 1620, the "Run VTX" button 1710, the "Build VTX Control File" button 1720, the "Load CFA Data" button 810, the "Edit File" button 660, the "Delete Data" button 1520, the "CFA Control Input File" button 710, the "Definitions" button 1730, the "Collector Info" button 1740, and the "80-12 Traj File" button 2520.

If the "Run CFA" button 610 is selected, the FOIPAT 100 allows the user to select the CFA input control file (block 3110), execute the CFA tool 110 (block 3112), and return to the start screen 3100. If the "Run TrajProp" button 1610 is selected, the FOIPAT 100 allows the user to select the TrajProp input control file (block 3114), execute the TrajProp tool 130 (block 3116), and return to the start screen 3100. If the "Run VTX button 1710 is selected, the FOIPAT 100 allows the user to select the VTX input control file (block 3118), execute the VTX tool 120 (block 3120), and return to the start screen 3100.

If the "Load CFA Data" button 810 is selected and if the file exists (block 3122), the FOIPAT 100 allows the user to select the data file (block 3124) and return to the start screen 3100. If the "Edit File" button 660 is selected, the FOIPAT 100 allows the user to select the file (block 3126), display the edited file 3028, and return to the start screen 3100. If the "Delete File" button 1520 is selected, the FOIPAT 100 allows the user to select the data file for deletion (block 3130) and return to the start screen 3100. If the "CFA Control Input File" button 710 is selected, the FOIPAT 100 allows the user to select the CFA control input file (block 3132), edit the selected control input file 3134, and return to the start screen 3100.

If the "Definitions" button 1730 is selected, the FOIPAT 100 displays the definitions of, for example, Alpha Angle 3136 and return to the start screen 3100. If the "Collector Information" button 1740 is selected, the FOIPAT 100 displays the collectors' information, such as the name and location 3138, and return to the start screen 3100. If the "80-12 Traj File" button 2520 is selected, the FOIPAT 100 allows the user to select the 80-12 Formatted File 3140, create a Trajectory text file 3142, and return to the start screen 3100.

The FOIPAT 100 determines whether the CFA, TrajProp, or VTX tools are executed (block 3144). If the tools are executed and if the "Program Report" button 630 is selected, the FOIPAT 100 generates a report 3150 and return to the start screen 3100. However, if the tools are not executed, the process goes to block 11 and the user can then choose to run the CFA tool 110, the TrajProp tool 130 or the VTX tool 120, and generate a Report. If the CFA tool 110 is executed and if the "CFA Summary Report" button 830 is selected, the FOIPAT 100 displays a CFA summary report 3156 and return to the start screen 3100. However, if the CFA tool 110 is not executed, the process goes to block 12 and the user is allowed to select the "Run CFA" button 610.

The FOIPAT 100 may further determine whether the CFA data is loaded in to the FOIPAT 100 (block 3158). If the data is loaded in and one of the plotting buttons 920 is selected, the FOIPAT 100 generates a plotting output (described in more detail with respect to FIG. 37). Additionally, the FOIPAT 100 may determine whether the plot is saved and if the new plot is drawn (block 3160). If yes and the "Draw Saved" button 2910 are selected, the FOIPAT 100 allows the user to input text to name the plot lines (block 3164), generate a plot 3166, and return to the start screen 3100. However, if the plot is not saved or if the new plot is not drawn, the process goes to block 12 and the user is allowed to select the "Run CFA" button 610. After one plot has been saved, a new comparison plot can not be drawn until after CFA has been executed on new data, new data has been loaded in, and the new plot generated.

The general process to compare two Gain Margin Plots is to 1) run the CFA tool 110 (by selecting the "Run CFA" button 610), select CFA input control file (block 3110), execute the CFA tool 110 (block 3112), and return to the start screen 3100; 2) load CFA data (by selecting the "Load CFA Data" button 810), if the file exists (block 3122), select data file (block 3124), and return to the start screen 3100; 3) determine if CFA data is loaded in (block 3158), is yes, select one of the plotting buttons 920 to generate a plot, and return to the start screen 3100; 4) save plot (by selecting the "Save Plot" button 2910, and return to the start screen 3100; 5) repeat steps 1) through 3) for another CFA input file and generate a plot.

Figure 32:
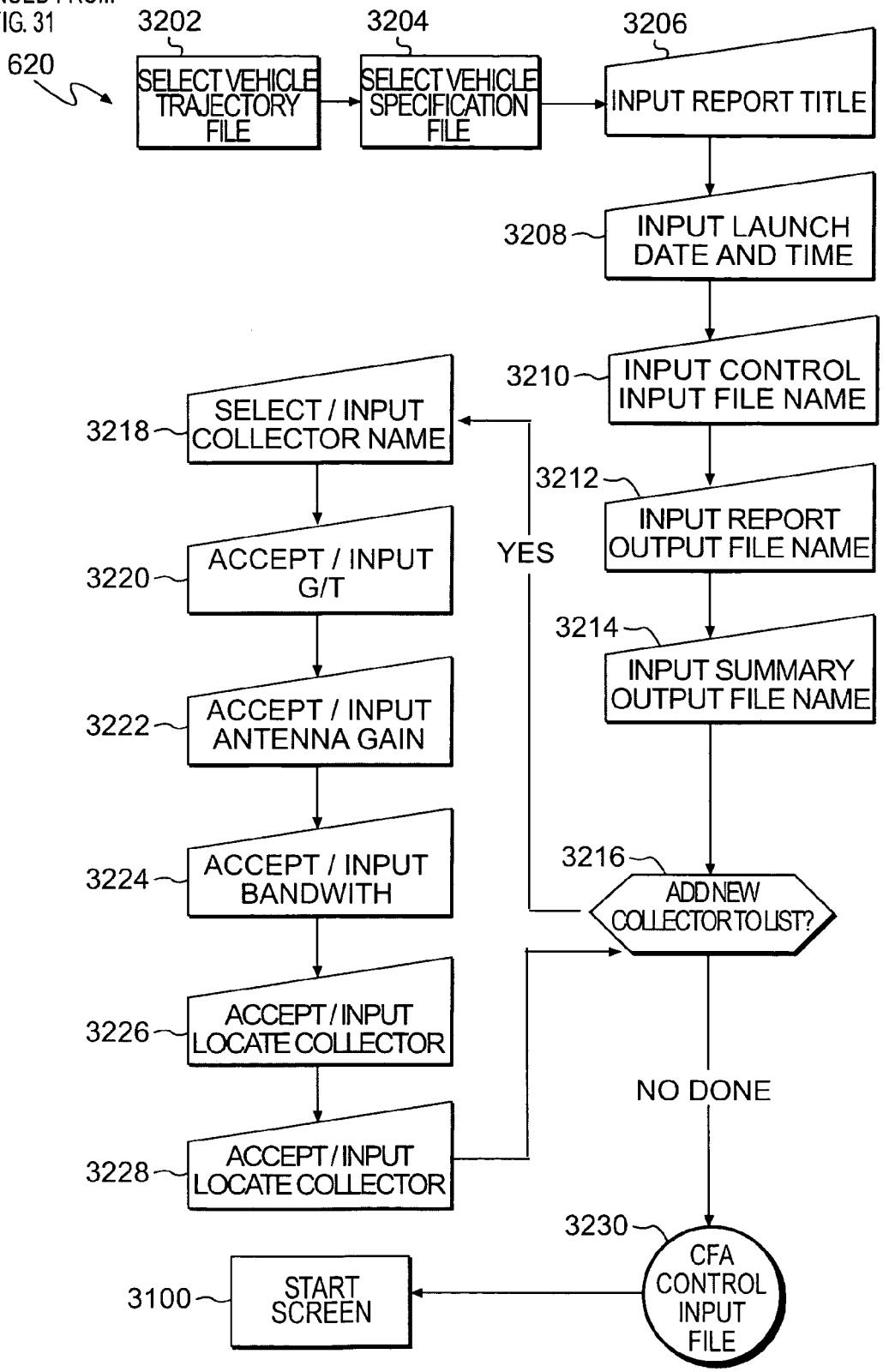

FIG. 32 is a flow chart illustrating the process of building a CFA control file by selecting the "Build CFA Control File" button 620. The FOIPAT 100 allows the user to select a vehicle trajectory file (block 3202) and select a vehicle specification file (block 3204). The user is allowed to select any one of the existing vehicle trajectory or vehicle specification files. Next, the FOIPAT 100 inputs the report title (block 3204), inputs the launch date and time (block 3208), inputs the control inputs file name (block 3210), inputs the report output file name (block 3212), and inputs the summary output file name (block 3214). If the user decides that a new collector is needed (block 3216), the FOIPAT 100 enables the user to select or input a collector's name (block 3218), accept or input G/T (block 3220), accept or input an antenna gain (block 3222), accept or input a bandwidth (block 3224), accept or input a locate collector (block 3226), and accept or input a position or ephemeris file name and path (block 3228). The user can accept the existing default values which are taken from the default data base set up at system installation or input new values of his or her choice. If no new collector needs to be added to the collector list, the FOIPAT 100 generates a CFA control input text file 3230 and return to the start screen 3100.

FIG. 33 is a flow chart illustrating the process of building a TrajProp input control file by selecting the "Build TP Control File" button 1620. The FOIPAT 100 enables the user to input the control input file name (block 3302), input the output summary file name (block 3304), input the earth geodetic model file name (block 3306), and enter the ephemeris or trajectory file name and path (block 3308). The FOIPAT 100 enables the user to select input vector units, such as feet (ft), meters (m), or nautical miles (nmi) (block 3310), and select a type of input orbit representation, such as Cartesian representation, Keplerian representation, ADGARV (or ADBARV) representation, 2-line ElSet representation, or 10-line ElSet representation (block 3312). The user can accept the default values or enter different values.

For Cartesian representation, the FOIPAT 100 enables the user to input the X, Y & Z position vector (block 3340) and input the X, Y & Z velocity vector (block 3342). The process goes to block 3370 which will be described in detail with respect to FIG. 35). For Keplerian Representation, the FOIPAT 100 enables the user to select a type of input being used, such as latitude or true anomaly (block 3346). The user can accept the default values or enter different values The FOIPAT 100 enables the user to input an argument of latitude (block 3348) or input a true anomaly (block 3350). The process goes to block 21, where the FOIPAT 100 enables the user to input the inclination (block 3320), input the argument of perigee (block 3322), input the right ascension (block 3324), input the orbit eccentricity (block 3326), and input the semi major axis (block 3328).

For ADGARV representation, the FOIPAT 100 enables the user to select the type of input being used, such as path angle or off vertical (block 3352). The user can accept the default values or enter different values. The FOIPAT 100 may input the flight path angle (block 3354) or input the flight path off vertical (block 3356). The process goes to block 22, where the FOIPAT 100 enables the user to input the right ascension (block 3330), input the declination (block 3332), input the radius (block 3334), input the speed (block 3336), and input the azimuth (block 3338). The process goes to block 3370, which will be described in more detail with respect to FIG. 35.

For 2-line ElSet representation, the FOIPAT 100 enables the user to select an ElSet file (block 3358). The user can accept the default values or enter different values. The process also goes to block 3370. The process involving the 10-line ElSet representation (block 3360) will be described with respect to FIG. 34.

Figure 34:
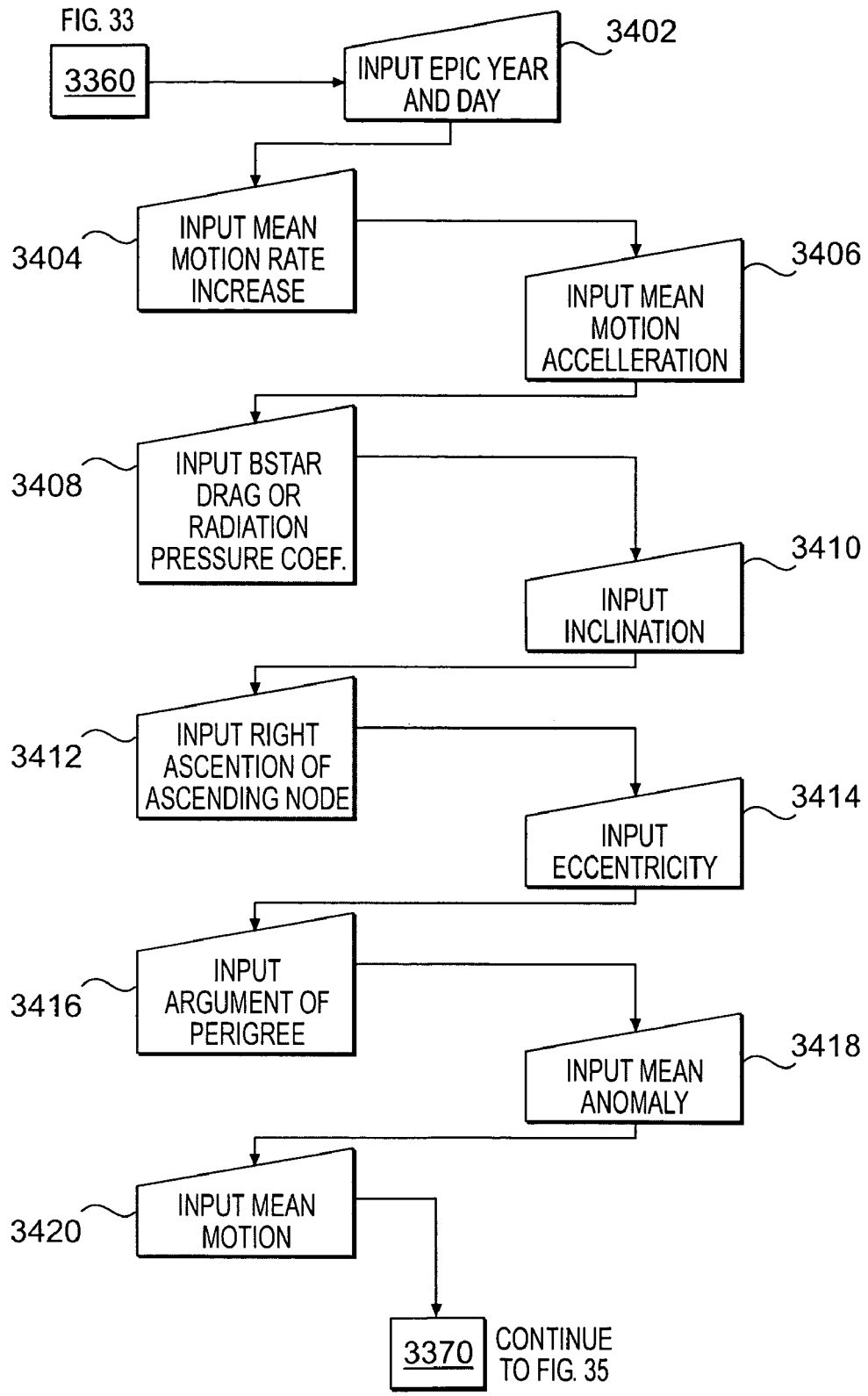

FIG. 34 is a flow chart illustrating the process involving the 10-line ElSet representation (block 3360) of FIG. 33. The FOIPAT 100 enables the user to input the epic year and day (block 3402), input the mean motion rate increase (block 3404), input the mean motion acceleration (block 3406), input the BSTAR drag or radiation pressure coefficient (block 3408), input the inclination (block 3410), input the right ascension of ascending node (block 3412), input the eccentricity (block 3414), input the argument of perigee (block 3416), input the mean anomaly (block 3418), and input the mean motion (block 3420). The process goes to block 3370, which will be described with respect to FIG. 35.

Figure 35:
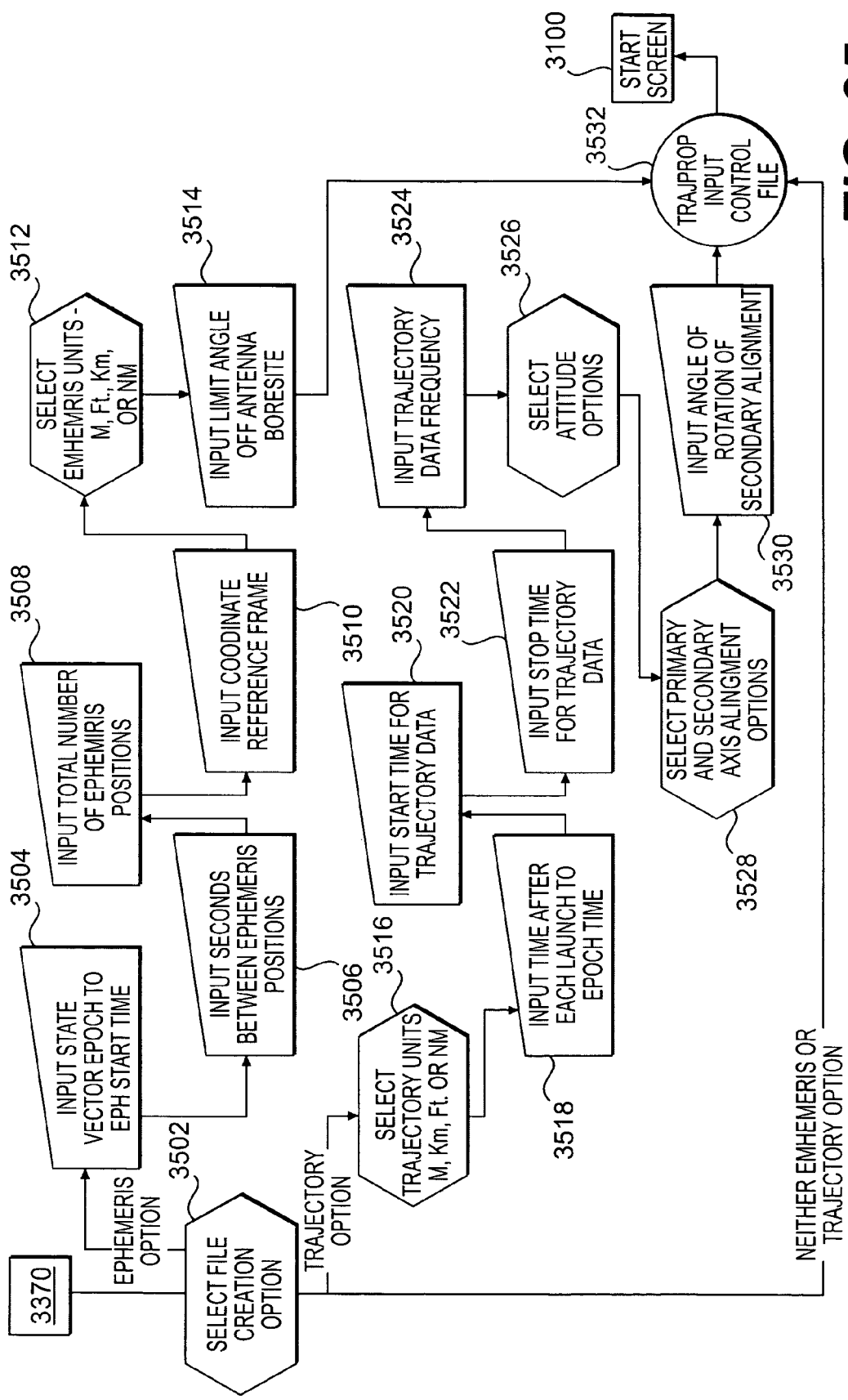

Referring to FIG. 35, the FOIPAT 100 enables the user to select one of three file creation options, an ephemeris option, a trajectory option, or neither option (block 3502). The user can accept the default option or select a different option. If the Ephemeris Option is selected, the FOIPAT 100 enables the user to input the state vector epoch to Ephemeris start time (block 3504), input the seconds between ephemeris positions (block 3506), input the total number of ephemeris positions (block 3508), and input the coordinate reference frame (block 3510). Next, the FOIPAT 100 enables the user to select ephemeris units, such as ft, m, km, or nmi (block 3512), or accept the default units. The FOIPAT 100 enables the user to input the limit angle off antenna boresite (block 3514), and FOIPAT 100 generates a TrajProp input control text file 3532, and return to the start screen 3100. The FOIPAT 100 accumulates all of the information inputted by the user in FIGS. 33, 34 and 35 and, using file I/O operations, creates a TrajProp input control file in text format. The TrajProp input control file can be examined by the user or inputted to the TrajProp tool 130.

If the trajectory option is selected, the FOIPAT 100 enables the user to select trajectory units, such as m, t, km, or nmi, or accept the default value (block 3516). Next, the FOIPAT 100 enables the user to input the time after launch to epoch time (block 3518), input the start time for trajectory data (block 3520), input the stop time for trajectory data (block 3522), and input the trajectory data frequency (block 3524). The FOIPAT 100 enables the user to select altitude options (block 3526) and select primary and secondary axis alignment options (block 3528). The user selects the appropriate values from list boxes. The FOIPAT 100 enables the user to input the angle of rotation of secondary alignment (block 3530). The FOIPAT 100 accumulates all of the information inputted by the user in FIGS. 33, 34 and 35 and, using file I/O operations, creates a TrajProp input control file in text format. The TrajProp input control file can be examined by the user or inputted to the TrajProp tool 130.

If neither the ephemeris nor trajectory option is selected, the FOIPAT 100 generates the TrajProp input control text file 3532, using file I/O operations, and returns to the start screen 3100.

Figure 36:
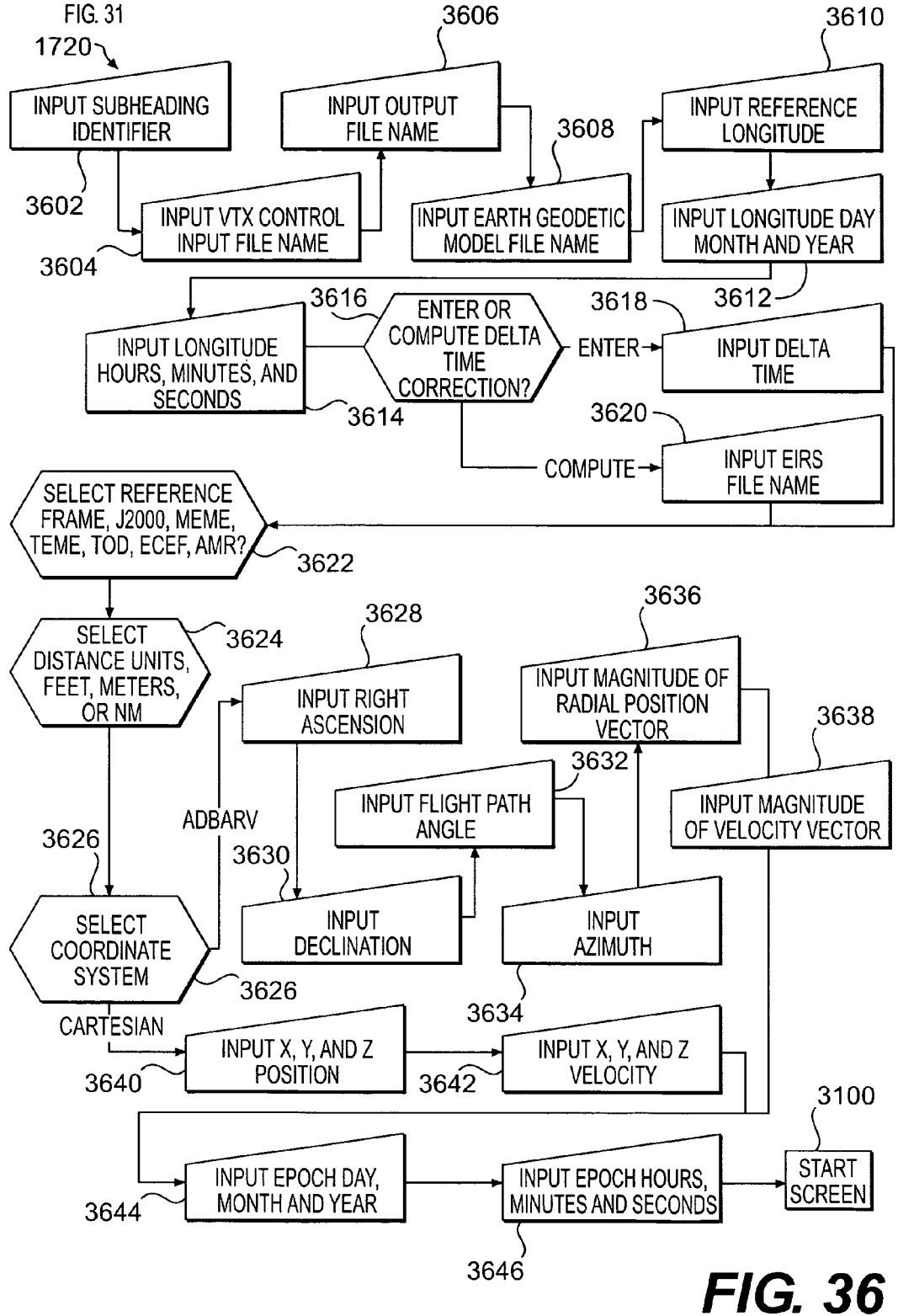

FIG. 36 is a flow chart illustrating the process of building a VTX control input file by selecting "Build VTX Control File" buttonl720. The FOIPAT 100 enables the user to input the subheading identifier (block 3602), input the VTX control input file name (block 3604), input the output file name (block 3606), input the earth geodetic model file name (block 3608), input the reference longitude (block 3610), input the longitude day moth and year (block 3612), and input the longitude hours, minutes, and seconds (block 3614). Next, the user make a selection as to whether the delta time correction is entered by the user or computed by the FOIPAT 100 (block 3616). If the user chooses to enter the delta time correction, the value is entered by the user (block 3618). Otherwise, the user enters the EIRS file name (block 3620) so that the FOIPAT 100 can calculate the delta time correction. Next, the FOIPAT 100 enables the user to select a reference frame, such as J2000, MEME, TEME, TOD, ECEF, or AMR (block 3622), select distance units, such as ft, m, or nmi (block 3624), and select a coordinate system, such as ADBARV or Cartesian (block 3626). The user selects these value from the listed values.

If ADBARV is selected, the FOIPAT enables the user to input the right ascension (block 3628), input the declination (block 3630), input the flight path angle (block 3632), input the azimuth (block 3634), input the magnitude of radial position vector (block 3636), input the magnitude of velocity vector (block 3638), input the epoch day, month and year (block 3644), input the epoch hours, minutes and seconds (block 3646). Next, the FOIPAT 100 returns to the start screen 3100. If Cartesian is selected, the FOIPAT enables the user to input the X, Y, and Z position (block 3640), input the X, Y, and Z velocity (block 3642), input the epoch day, month and year (block 3644), input the epoch hours, minutes and seconds (block 3646). After the user accepts the default values or enters these values, FOIPAT 100 returns to the start screen 3100.

Figure 37:
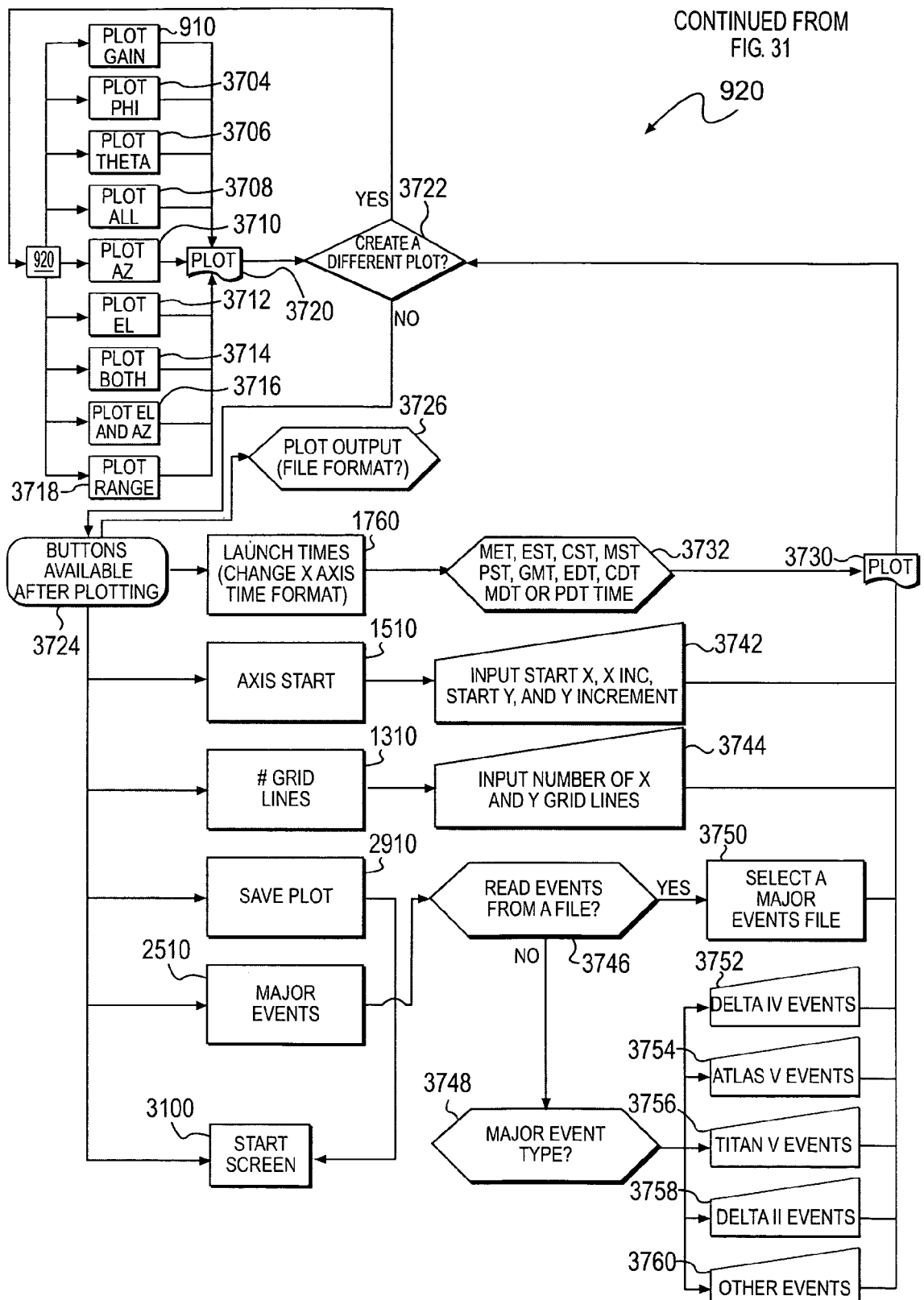

FIG. 37 is a flow chart illustrating the process of plotting output of 920. As noted above, the plotting buttons 920 include plot "Gain" button 910, plot "Phi" button 3704, plot "Theta" button 3706, plot "All" button 3708, plot "Az" button 3710, plot "El" button 3712, plot "Both" button 3714, plot "El and Az" button 3716, and plot "Range" button 3718. The FOIPAT 100 creates a plot (block 3720) according to the selections. All plotting may be performed using, for example, the MATLAB® function "plot" with the appropriate parameters, labels and titles inputted by the FOIPAT 100. After a specific plot is generated, the FOIPAT 100 returns to the start screen 3100 so new plots can be generated or other buttons can be selected. Once a plot is generated, several buttons become available that initially were not available. These buttons include the "Plot Output" button 3726, the "Launch Times" button 1760, the "Axis Start" button 1510, the "#Grid Lines" button 1310, the "Save Plot" button 2910, and the "Major Events" button 2510. After a plot is generated, the "Plot Output" button 3726 allows the user to generate the current plot in several different file formats, e.g., including: PNG, HPGL, EPS, PSC2, TIFF, PDF, or JPEG.

If the "Launch Times" button 1760 is selected after plotting, the FOIPAT 100 enables the user to select from, for example MET (Mission Elapse Time), EST (Eastern Standard Time), CST (Central Standard Time), MST (Mountain Standard Time), PST (Pacific Standard Time), GMT (Greenwich Mean Time), EDT (Eastern Daylight Time), CDT (Central Daylight Time), MDT (Mountain Daylight Time), or PDT (Pacific Daylight Time) time (block 332). The FOIPAT 100 creates the plot with the x-axis time set according to the selections (block 3730). If the "Axis Start" button 1510 is selected after plotting, the FOIPAT 100 enables the user to input the start X, X increment, start Y, and Y increment (block 3742) and FOIPAT 100 creates the plot according to the selections (block 3730). If the "# Grid Lines" button 1310 is selected after plotting, the FOIPAT 100 enables the user to input the number of X and Y grid lines (block 3744) and FOIPAT 100 creates the plot according to the selections (block 3730). _If the "Save Plot" button 2910 is selected after plotting, the FOIPAT 100 saves the plot and returns to the start screen 3100. If the "Major Events" button 2510 is selected after plotting, the FOIPAT 100 determines if the events can be read from a file (block 3746). If yes, the FOIPAT 100 enables the user to select a major events file (block 3750) and create the plot according to the selections (block 3730). _If the events cannot be read from a file, the FOIPAT 100 determines the major event type (block 3748). Depending on the user selection of Delta IV events 3752, Atlas V events 3754, Titan IV events 3756, Delta II events 3758, or other events 3760, the FOIPAT 100 requests appropriate event information (3752, 3774, 3756, 3758 or 3760) from the user and redraws the current plot using the "Plot Output" button 3730 with the events represented by vertical lines.

Figure 38:
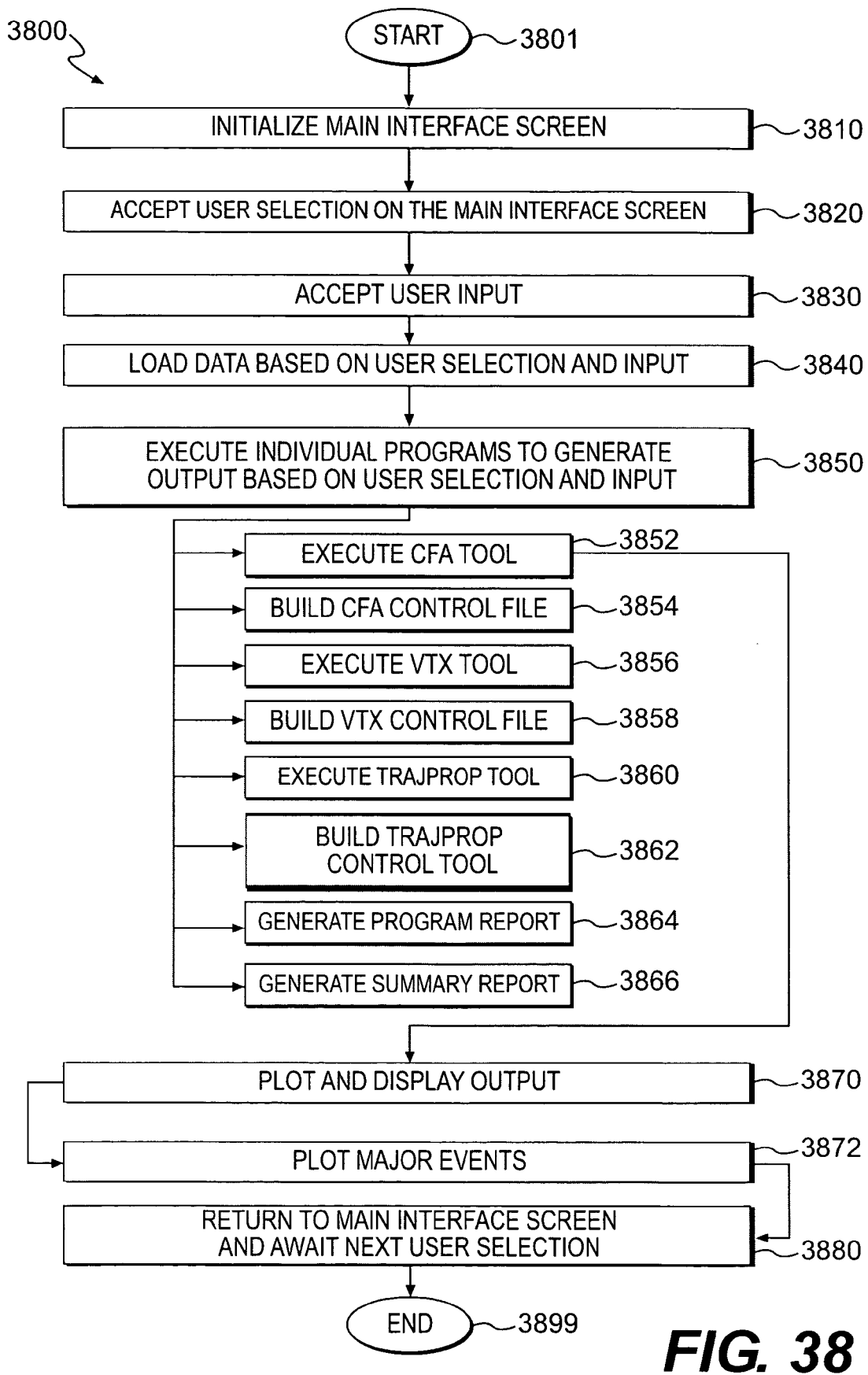
FIG. 38 is a flow chart illustrating an exemplary method for providing flight operations integrated planning and analysis tools.

FIG. 38 is a flow chart illustrating an exemplary method 3800 for providing flight operations integrated planning and analysis tools. The method 3800 starts (block 3801) by initializing a main interface screen 650 (block 3810). The method 3800 accepts a user selection on the main interface screen 650 (block 3820) and accept user input of certain criteria (block 3830) when requested. The method 3800 may then load data based on the user selection and user input (block 3840). The method 3800 may execute individual programs to generate output based on the user selection and input (block 3850). For example, the method 3800 may execute the CFA tool 110 (block 3852) and build the CFA control input file (block 3854) that can subsequently be inputted to the CFA tool 110 and executed. The method 3800 may also execute the VTX tool 120 (block 3856) and build the VTX control input file (block 3858) that can subsequently be inputted to the VTX tool 120 and executed. The method 3800 may further execute the TrajProp tool 130 (block 3860) and build the TrajProp control input file (block 3862) that can subsequently be inputted to the TrajProp tool 130 and executed.

The method 3800 may generate a program report (block 3864) on the CFA tool 110, the VTX tool 120 or the TrajProp tool 130. The method 3800 may alternatively generate a summary report (block 3866) on the CFA tool 110. Next, the method 3800 may plot and display the output (block 3870), including the major events (block 3872). Finally, the method 3800 may return to the main interface screen 650 and await next user selection (block 3880) or end (block 3899).

Figure 39:
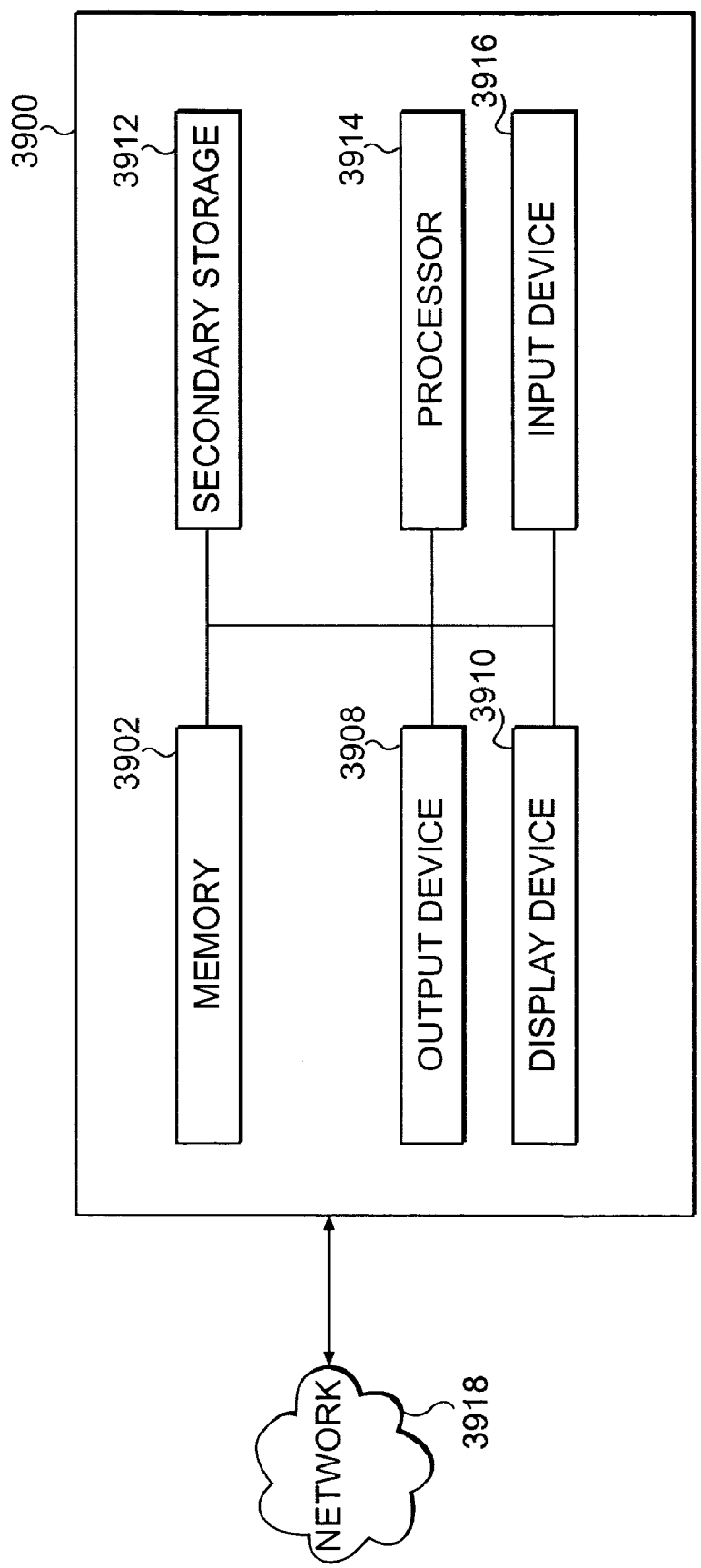
FIG. 39 illustrates exemplary hardware components of a computer that may be used in connection with the exemplary method for providing flight operations integrated planning and analysis tools.

FIG. 39 illustrates exemplary hardware components of a computer 3900 that may be used in connection with the method for providing flight operations integrated planning and analysis tools. The computer 3900 includes a connection with a network 3918 such as the Internet or other type of computer or telephone network. The computer 3900 typically includes a memory 3902, a secondary storage device 3912, a processor 3914, an input device 3916, a display device 3910, and an output device 3908.

The memory 3902 may include random access memory (RAM) or similar types of memory. The secondary storage device 3912 may include a hard disk drive, floppy disk drive, CD-ROM drive, or other types of non-volatile data storage, and may correspond with various databases or other resources. The processor 3914 may execute information stored in the memory 3902, the secondary storage 3912, or received from the Internet or other network 3918. The input device 3916 may include any device for entering data into the computer 3900, such as a keyboard, keypad, cursor-control device, touch-screen (possibly with a stylus), or microphone. The display device 3910 may include any type of device for presenting visual image, such as, for example, a computer monitor, flat-screen display, or display panel. The output device 3908 may include any type of device for presenting data in hard copy format, such as a printer, and other types of output devices including speakers or any device for providing data in audio form. The computer 3900 can possibly include multiple input devices, output devices, and display devices.

Although the computer 3900 is depicted with various components, one skilled in the art will appreciate that the computer 3900 can contain additional or different components. In addition, although aspects of an implementation consistent with the method for providing flight operations integrated planning and analysis tools are described as being stored in memory, one skilled in the art will appreciate that these aspects can also be stored on or read from other types of computer program products or computer-readable media, such as secondary storage devices, including hard disks, floppy disks, or CD-ROM; a signal embodied in a carrier wave from the Internet or other network; or other forms of RAM or ROM. The computer-readable media may include instructions for controlling the computer 3900 to perform a particular method.

While the apparatus and method for providing flight operations integrated planning and analysis tools have been described in connection with an exemplary embodiment, those skilled in the art will understand that many modifications in light of these teachings are possible, and this application is intended to cover variations thereof.

What is claimed is:

1. An apparatus for providing a flight operations integrated planning and analysis tool (FOIPAT) to determine and display results of the feasibility of collecting flight vehicle telemetry with predetermined assets, comprising:

a collection feasibility analysis (CFA) tool that analyzes telemetry links for sources that move relative to collectors to determine which collectors to be used during vehicle launches;

a vector transformation (VTX) tool that transforms orbital state vectors from one earth-centered astronomical reference frame to others;

a trajectory propagation (TrajProp) tool that generates ephemeris and trajectory input files for the CFA tool;

an interface that integrates the CFA tool, the VTX tool, and the TrajProp tool, the interface including a main interface screen, wherein the apparatus accepts a user selection and a user input on the main interface screen, loads data based on the user selection and the user input, executes individual programs to generate an output based on the user selection and the user input, and plots and displays the output with an appearance based on the user selection.

2. The apparatus of claim 1, wherein the CFA tool comprises one or more modules selected from a group consisting of: a check alternate telemetry module, an alternate file handler module, a check feasibility module, a data subroutines module, a get names module, a transforms for alternate telemetry module (ALTTM) module, and a target vehicle specification information module.

3. The apparatus of claim 1, wherein the VTX tool comprises one or more modules selected from a group consisting of: a VTX module and a vector transformation input/output (VTXIO) module.

4. The apparatus of claim 3, wherein the VTX module generates Keplerian and oblate earth orbit characteristics.

5. The apparatus of claim 1, wherein the TrajProp tool comprises one or more modules selected from a group consisting of: a trajectory propagation module, a trajectory propagation input/output (I/O) module, an Aries module, a geodetic nadir module, a geodetic zenith module, a nadir module, a negative Aries module, a negative sun north module, a negative sun orbit module, a negative velocity module, a right ascension declination nadir module, a right ascension declination sun module, a sun nadir module, a right ascension declination module, a sun north ecliptic module, a sun north module, a sun orbit module, a sun south ecliptic module, a sun zenith module, a velocity module, a zenith module, a unit vector module, a transformations module, a sun subroutines module, a text mapper module, a cross product module, a dot product module, a date subroutines module, a fill vector module, a matrix vector module, and a NORAD module.

6. The apparatus of claim 1, wherein the FOIPAT comprises one or more modules selected from a group consisting of: a flight operation integrated planning and analysis tool main module, a major events module, a Delta IV major event set module, a Delta II major event set module, an Atlas V major event set module, a Titan IV major event set module, a trajectory propagation input module, an input Cartesian representation module, an input Keplarian representation module, an input NORAD 2-line representation module, an input NORAD 10-line representation module, an input ADGARV representation module, an input Ephemeris module, an input trajectory module, a vector transformation main input module, a vector transformation main two input module, a CFA main input module, and a space-ground input module.

7. The apparatus of claim 1, wherein the interface comprises one or more buttons selected from a group consisting of: an edit file button, plotting buttons, a range button, a plot output button, a delete data button, a major events button, a CFA control input file button, a program report button, a CFA summary report button, a definitions button, a collector information button, a launch times button, an 80-12 trajectory file button, a save plot and draw saved button, a build CFA control file button, a run CFA button, a load CFA data button, a #grid lines button, an axes start button, a run TrajProp button, a build TrajProp control file button, a run VTX button, a build VTX control file button, and an exit button.

8. The apparatus of claim 7, wherein the plotting buttons include a gain button, a phi angle button, a theta angle button, an all button, an azimuth button, an elevation button, and an elevation versus azimuth button for plotting.

9. A method for providing a flight operations integrated planning and analysis tool (FOIPAT) to determine and display results of the feasibility of collecting flight vehicle telemetry with predetermined assets, the method comprising the steps of:

executing a collection feasibility analysis (CFA) tool, the CFA tool analyzes telemetry links for sources that move relative to collectors to determine which collectors to be used during vehicle launches;

executing a vector transformation (VTX) tool, the VTX tool transforms orbital state vectors from one earth-centered astronomical reference frame to others;

executing a trajectory propagation (TrajProp) tool, the TrajProp tool generating ephemeris and trajectory input files for the CFA tool;

providing an interface that integrates the CFA tool, the VTX tool, and the TrajProp tool, the interface including a main interface screen, wherein the method accepts a user selection and a user input on the main interface screen, loads data based on the user selection and the user input, executes individual programs to generate an output based on the user selection and the user input, and plots and displays the output.

10. The method of claim 9, wherein the CFA tool comprises one or more modules selected from a group consisting of: a check alternate telemetry module, an alternate file handler module, a check feasibility module, a data subroutines module, a get names module, a transforms for alternate telemetry module (ALTTM) module, and a target vehicle specification information module.

11. The method of claim 9, wherein the VTX tool comprises one or more modules selected from a group consisting of: a VTX module and a vector transformation input/output (VTXIO) module.

12. The method of claim 11, wherein the VTX module generates Keplerian and oblate earth orbit characteristics.

13. The method of claim 9, wherein the TrajProp tool comprises one or more modules selected from a group consisting of: a trajectory propagation module, a trajectory propagation input/output (I/O) module, an Aries module, a negative Aries module, a negative sun north module, a negative sun orbit module, a negative velocity module, a right ascension declination nadir module, a right ascension declination sun module, a sun nadir module, a right ascension declination module, a sun north ecliptic module, a sun north module, a sun orbit module, a sun south ecliptic module, a sun zenith module, a velocity module, a zenith module, a unit vector module, a transformations module, a sun subroutines module, a text mapper module, a cross product module, a dot product module, a date subroutines module, a fill vector module, a matrix vector module, and a NORAD module.

14. The method of claim 9, wherein the FOIPAT comprises one or more modules selected from a group consisting of: a flight operation integrated planning and analysis tool main module, a major events module, a Delta IV major event set module, a Delta II major event set module, an Atlas V major event set module, a Titan IV major event set module, a trajectory propagation input module, an input Cartesian representation module, an input Keplarian representation module, an input NORAD 2-line representation module, an input NORAD 10-line representation module, an input ADGARV representation module, an input Ephemeris module, an input trajectory module, a vector transformation main input module, a vector transformation main two input module, a CFA main input module, and a space-ground input module.

15. The method of claim 9, further comprising building a CFA control file based on data provided by the FOIPAT.

16. The method of claim 9, further comprising building a VTX control file based on data provided by the FOIPAT.

17. The method of claim 9, further comprising building a TrajProp control file based on data provided by the FOIPAT.

18. The method of claim 9, further comprising generating a program report based on data provided by the CFA tool, the VTX tool, and the TrajProp tool.

19. The method of claim 9, further comprising generating a summary report based on data provided by the CFA tool.

20. The method of claim 9, further comprising plotting outputs on the interface based on data provided by the CFA tool, the VTX tool, and the TrajProp tool.

21. The method of claim 20, further comprising plotting major events based on data provided by the CFA tool, the VTX tool, and the TrajProp tool.

22. The method of claim 20, further comprising plotting a gain based on data provided by the CFA tool, the VTX tool, and the TrajProp tool.

23. The method of claim 20, further comprising plotting a phi angle based on data provided by the CFA tool, the VTX tool, and the TrajProp tool.

24. The method of claim 20, further comprising plotting a theta angle based on data provided by the CFA tool, the VTX tool, and the TrajProp tool.

25. The method of claim 20, further comprising plotting an azimuth based on data provided by the CFA tool, the VTX tool, and the TrajProp tool.

26. The method of claim 20, further comprising plotting an elevation based on data provided by the CFA tool, the VTX tool, and the TrajProp tool.

27. The method of claim 20, further comprising plotting an elevation versus azimuth based on data provided by the CFA tool, the VTX tool, and the TrajProp tool.

28. A method for providing a flight operations integrated planning and analysis tool (FOIPAT) to determine and display results of the feasibility of collecting flight vehicle telemetry with predetermined assets, the method comprising the steps of:
   initializing a main interface screen in an interface;
   accepting a user selection related to flight vehicle telemetry data and a user input on the main interface screen;
   loading data based on the user selection and the user input;
   executing one or more individual programs selected from a group consisting of: a collection feasibility analysis (CFA) tool, a vector transformation (VTX) tool, and a trajectory propagation (TrajProp) tool, to generate an output based on the user selection and the user input, wherein the interface integrates the CFA tool, the VTX tool, and the TrajProp tool; and
   plotting and displaying the output.

29. The method of claim 28, further comprising building a CFA control file based on data provided by the FOIPAT.

30. The method of claim 28, further comprising building a VTX control file based on data provided by the FOIPAT.

31. The method of claim 28, further comprising building a TrajProp control file based on data provided by the FOIPAT.

32. The method of claim 28, further comprising generating a program report based on data provided by the CFA tool, the VTX tool, and the TrajProp tool.

33. The method of claim 28, further comprising generating a summary report based on data provided by the CFA tool.

34. The method of claim 28, further comprising editing files selected by the user.

35. The method of claim 28, further comprising plotting outputs on the interface based on data provided by the CFA tool, the VTX tool, and the TrajProp tool.

36. The method of claim 35, further comprising plotting major events based on data provided by the CFA tool, the VTX tool, and the TrajProp tool.

37. A computer readable medium providing instructions for providing a flight operations integrated planning and analysis tool (FOIPAT) to determine and display results of the feasibility of collecting flight vehicle telemetry with predetermined assets, the instructions being executed on a computer and comprising:
   initializing a main interface screen in an interface;
   accepting a user selection related to flight vehicle telemetry data and a user input on the main interface screen;
   loading data based on the user selection and the user input;
   executing one or more individual programs selected from a group consisting of: a collection feasibility analysis (CFA) tool, a vector transformation (VTX) tool, and a trajectory propagation (TrajProp) tool, to generate an output based on the user selection and the user input, wherein the interface integrates the CFA tool, the VTX tool, and the TrajProp tool; and
   plotting and displaying the output.

38. The computer readable medium of claim 37, further comprising building a CFA control file based on data provided by the FOIPAT.

39. The computer readable medium of claim 37, further comprising building a VTX control file based on data provided by the FOIPAT.

40. The computer readable medium of claim 37, further comprising building a TrajProp control file based on data provided by the FOIPAT.

41. The computer readable medium of claim 37, further comprising generating a program report based on data provided by the CFA tool, the VTX tool, and the TrajProp tool.

42. The computer readable medium of claim 37, further comprising generating a summary report based on data provided by the CFA tool.

43. The computer readable medium of claim 37, further comprising editing files selected by the user.

44. The computer readable medium of claim 37, further comprising plotting outputs on the interface based on data provided by the CFA tool, the VTX tool, and the TrajProp tool.

45. The computer readable medium of claim 44, further comprising plotting major events based on data provided by the CFA tool, the VTX tool, and the TrajProp tool.

* * * * *